(12) United States Patent
Momo

(10) Patent No.: US 9,859,585 B2
(45) Date of Patent: Jan. 2, 2018

(54) POWER STORAGE DEVICE

(71) Applicant: SEMICONDUCTOR ENERGY LABORATORY CO., LTD., Atsugi-shi, Kanagawa-ken (JP)

(72) Inventor: Junpei Momo, Kanagawa (JP)

(73) Assignee: SEMICONDUCTOR ENERGY LABORATORY CO., LTD., Kanagawa-ken (JP)

(*) Notice: Subject to any disclaimer, the term of this patent is extended or adjusted under 35 U.S.C. 154(b) by 635 days.

(21) Appl. No.: 13/778,205

(22) Filed: Feb. 27, 2013

(65) Prior Publication Data
US 2013/0224562 A1 Aug. 29, 2013

(30) Foreign Application Priority Data
Feb. 29, 2012 (JP) .................. 2012-042918

(51) Int. Cl.
*H01M 2/02* (2006.01)
*H01M 2/16* (2006.01)
(Continued)

(52) U.S. Cl.
CPC ........ *H01M 10/0436* (2013.01); *H01G 11/12* (2013.01); *H01G 11/52* (2013.01); *H01G 11/76* (2013.01); *H01G 11/78* (2013.01); *H01M 2/266* (2013.01); *H01M 10/0472* (2013.01); *H01M 10/052* (2013.01); *H01M 10/0585* (2013.01);
(Continued)

(58) Field of Classification Search
CPC .......... H01M 2/02; H01M 2/04; H01M 10/04; H01M 10/0436

USPC ............... 429/149, 331, 130, 131, 233, 127; 29/623.1, 623.3
See application file for complete search history.

(56) References Cited

U.S. PATENT DOCUMENTS 2,853,442 A 9/1958 Swanton
4,302,518 A 11/1981 Goodenough et al.
(Continued)

FOREIGN PATENT DOCUMENTS

CN 101562248 A 10/2009
EP 1180806 A 2/2002
(Continued)

OTHER PUBLICATIONS

Sundaram et al., "Electrochemical Modification of Graphene", Advanced Materials, Aug. 18, 2008, vol. 20, No. 16, pp. 3050-3053.
(Continued)

*Primary Examiner* — Kenneth J Douyette
(74) *Attorney, Agent, or Firm* — Nixon Peabody LLP; Jeffrey L. Costellia

(57) ABSTRACT

To provide a sheet-like power storage device which can be curved or bent in at least one axis direction. A power storage device includes a power storage element including a plurality of flexible sheet-like positive electrodes each having one end portion fixed to a positive electrode tab; a plurality of flexible sheet-like negative electrodes each having one end portion fixed to a negative electrode tab; and a plurality of flexible sheet-like separators. The positive electrodes and the negative electrodes are alternately stacked so as to overlap with each other with the separator interposed therebetween. The power storage element is sealed in a flexible exterior body.

20 Claims, 8 Drawing Sheets

(51) Int. Cl.
| | | |
|---|---|---|
| *H01M 10/04* | (2006.01) | |
| *H01M 10/052* | (2010.01) | |
| *H01G 11/12* | (2013.01) | |
| *H01G 11/52* | (2013.01) | |
| *H01G 11/76* | (2013.01) | |
| *H01G 11/78* | (2013.01) | |
| *H01M 2/26* | (2006.01) | |
| *H01M 10/0585* | (2010.01) | |
| *H01M 4/62* | (2006.01) | |

(52) U.S. Cl.
CPC ........ *H01M 2/0275* (2013.01); *H01M 2/1653* (2013.01); *H01M 4/625* (2013.01); *Y02E 60/13* (2013.01)

(56) References Cited

U.S. PATENT DOCUMENTS

| | | | |
|---|---|---|---|
| 4,668,595 A | 5/1987 | Yoshino et al. | |
| 5,756,229 A * | 5/1998 | Pyszczek | H01M 2/263 29/623.1 |
| 5,761,801 A | 6/1998 | Gebhardt et al. | |
| 5,783,333 A | 7/1998 | Mayer | |
| 5,871,866 A | 2/1999 | Barker et al. | |
| 5,910,382 A | 6/1999 | Goodenough et al. | |
| 6,020,086 A * | 2/2000 | Van Lerberghe | 429/163 |
| 6,085,015 A | 7/2000 | Armand et al. | |
| 6,193,814 B1 | 2/2001 | Baldi | |
| 6,461,762 B1 * | 10/2002 | Yang et al. | 429/127 |
| 6,514,640 B1 | 2/2003 | Armand et al. | |
| 6,528,203 B1 * | 3/2003 | Mitamura | 429/98 |
| 6,599,659 B1 | 7/2003 | Endo et al. | |
| 6,743,546 B1 | 6/2004 | Kaneda et al. | |
| 6,780,207 B1 * | 8/2004 | Han et al. | 29/623.3 |
| 7,049,028 B2 | 5/2006 | Notten et al. | |
| 7,179,561 B2 | 2/2007 | Niu et al. | |
| 7,572,542 B2 | 8/2009 | Naoi | |
| 7,658,901 B2 | 2/2010 | Prud'Homme et al. | |
| 7,745,047 B2 | 6/2010 | Zhamu et al. | |
| 7,833,664 B2 | 11/2010 | Fujita et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,263,264 B2 | 9/2012 | Fujita et al. | |
| 8,278,011 B2 | 10/2012 | Zhu et al. | |
| 8,317,984 B2 | 11/2012 | Gilje | |
| 2001/0010807 A1 | 8/2001 | Matsubara | |
| 2002/0195591 A1 | 12/2002 | Ravet et al. | |
| 2003/0039883 A1 * | 2/2003 | Notten et al. | 429/176 |
| 2004/0043294 A1 | 3/2004 | Fukui et al. | |
| 2004/0161669 A1 * | 8/2004 | Zolotnik et al. | 429/233 |
| 2005/0048361 A1 * | 3/2005 | Wang et al. | 429/130 |
| 2006/0051671 A1 | 3/2006 | Thackeray et al. | |
| 2007/0096688 A1 | 5/2007 | Suzuki et al. | |
| 2007/0131915 A1 | 6/2007 | Stankovich et al. | |
| 2007/0227633 A1 | 10/2007 | Basol | |
| 2008/0048153 A1 | 2/2008 | Naoi | |
| 2008/0254296 A1 | 10/2008 | Handa et al. | |
| 2009/0110627 A1 | 4/2009 | Choi et al. | |
| 2009/0117467 A1 | 5/2009 | Zhamu et al. | |
| 2010/0035093 A1 | 2/2010 | Ruoff et al. | |
| 2010/0055025 A1 | 3/2010 | Jang et al. | |
| 2010/0081057 A1 | 4/2010 | Liu et al. | |
| 2010/0105834 A1 | 4/2010 | Tour et al. | |
| 2010/0143798 A1 | 6/2010 | Zhamu et al. | |
| 2010/0176337 A1 | 7/2010 | Zhamu et al. | |
| 2010/0227228 A1 * | 9/2010 | Yamazaki et al. | 429/331 |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0301279 A1 | 12/2010 | Nesper et al. | |
| 2010/0303706 A1 | 12/2010 | Wallace et al. | |
| 2010/0308277 A1 | 12/2010 | Grupp | |
| 2010/0330421 A1 | 12/2010 | Cui et al. | |
| 2011/0012067 A1 | 1/2011 | Kay | |
| 2011/0052975 A1 * | 3/2011 | Lee | 429/178 |
| 2011/0104520 A1 * | 5/2011 | Ahn | H01M 2/22 429/7 |
| 2011/0111294 A1 | 5/2011 | Lopez et al. | |
| 2011/0111303 A1 | 5/2011 | Kung et al. | |
| 2011/0121240 A1 | 5/2011 | Amine et al. | |
| 2011/0136019 A1 | 6/2011 | Amiruddin et al. | |
| 2011/0159372 A1 | 6/2011 | Zhamu et al. | |
| 2011/0227000 A1 | 9/2011 | Ruoff et al. | |
| 2011/0229795 A1 | 9/2011 | Niu et al. | |
| 2012/0021273 A1 | 1/2012 | Ohmori et al. | |
| 2012/0045692 A1 | 2/2012 | Takemura et al. | |
| 2012/0058397 A1 | 3/2012 | Zhamu et al. | |
| 2012/0064409 A1 | 3/2012 | Zhamu et al. | |
| 2012/0088151 A1 | 4/2012 | Yamazaki et al. | |
| 2012/0088156 A1 | 4/2012 | Nomoto et al. | |
| 2012/0100402 A1 | 4/2012 | Nesper et al. | |
| 2012/0308884 A1 | 12/2012 | Oguni et al. | |
| 2012/0308891 A1 | 12/2012 | Todoriki et al. | |
| 2012/0315550 A1 | 12/2012 | Liu et al. | |
| 2013/0045156 A1 | 2/2013 | Nomoto et al. | |
| 2013/0084384 A1 | 4/2013 | Yamakaji | |
| 2013/0134051 A1 | 5/2013 | Takahashi et al. | |
| 2013/0266859 A1 | 10/2013 | Todoriki et al. | |
| 2013/0266869 A1 | 10/2013 | Todoriki et al. | |

FOREIGN PATENT DOCUMENTS

| | | |
|---|---|---|
| EP | 1202371 A | 5/2002 |
| EP | 1840987 A | 10/2007 |
| JP | 08-037007 A | 2/1996 |
| JP | 10-157008 A | 6/1998 |
| JP | 2002-063938 A | 2/2002 |
| JP | 2002-222664 A | 8/2002 |
| JP | 2003-092132 A | 3/2003 |
| JP | 2003-123743 A | 4/2003 |
| JP | 2003-187759 A | 7/2003 |
| JP | 2003-238131 A | 8/2003 |
| JP | 2005-501385 | 1/2005 |
| JP | 2006-265751 A | 10/2006 |
| JP | 2006-331874 A | 12/2006 |
| JP | 2007-066619 A | 3/2007 |
| JP | 2007-123081 | 5/2007 |
| JP | 2007-273143 A | 10/2007 |
| JP | 2008-166155 A | 7/2008 |
| JP | 2009-524567 | 7/2009 |
| JP | 2009-176721 A | 8/2009 |
| JP | 2010-232011 A | 10/2010 |
| JP | 2011-500488 | 1/2011 |
| JP | 2011-503804 | 1/2011 |
| JP | 2011-048992 A | 3/2011 |
| JP | 2011-517053 | 5/2011 |
| JP | 2011-105569 A | 6/2011 |
| JP | 2011-258439 A | 12/2011 |
| JP | 2013-211262 A | 10/2013 |
| JP | 2015-097216 A | 5/2015 |
| WO | WO-00/59063 | 10/2000 |
| WO | WO-03/019698 | 3/2003 |
| WO | WO-2005/045983 | 5/2005 |
| WO | WO-2006/062947 | 6/2006 |
| WO | WO-2006/071076 | 7/2006 |
| WO | WO-2007/061945 | 5/2007 |
| WO | WO-2009/061685 | 5/2009 |
| WO | WO-2009/127901 | 10/2009 |
| WO | WO-2009/144600 | 12/2009 |
| WO | WO-2011/026581 | 3/2011 |
| WO | WO-2011/141486 | 11/2011 |

OTHER PUBLICATIONS

Zhou et al., "Controlled Synthesis of Large-Area and Patterned Electrochemically Reduced Graphene Oxide Films", Chemistry A European Journal, Jun. 15, 2009, vol. 15, No. 25, pp. 6116-6120.
Shao et al.,Facile and Controllable Electrochemical Reduction of Graphene Oxide and Its Applications, Journal of Materials Chemistry, 2010, vol. 20, pp. 743-748.

(56) References Cited

OTHER PUBLICATIONS

Padhi.A et al., "Phospho-olivines as Positive-Electrode Materials for Rechargeable Lithium Batteries", J. Electrochem. Soc. (Journal of the Electrochemical Society), Apr. 1, 1997, vol. 144, No. 4, pp. 1188-1194.

Zhou.X et al., "Graphene modified LiFePO4 cathode materials for high power lithium ion batteries", J. Mater. Chem. (Journal of Materials Chemistry), 2011, vol. 21, pp. 3353-3358.

Paek.S et al., "Enhanced Cyclic Performance and Lithium Storage Capacity of SnO2/Graphene Nanoporous Electrodes with Three-Dimensionally Delaminated Flexible Structure", Nano Letters, 2009, vol. 9, No. 1, pp. 72-75.

Wang.G et al., "Sn/graphene nanocomposite with 3D architecture for enhanced reversible lithium storage in lithium ion batteries", J. Mater. Chem. (Journal of Materials Chemistry), 2009, vol. 19, No. 44, pp. 8378-8384.

Wang.D et al., "Self-Assembled TiO2-Graphene Hybrid Nanostructures for Enhanced Li-Ion Insertion", ACS Nano, 2009, vol. 3, No. 4, pp. 907-914.

Su.F et al., "Flexible and planar graphene conductive additives for lithium-ion batteries", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Todoriki.H et al., "High performance lithium ion battery using Graphene Net electrode", 222nd ECS Meeting Abstract, Oct. 7, 2012, p. 1014, ECS.

Wang.Z et al., "Direct Electrochemical Reduction of Single-Layer Graphene Oxide and Subsequent Functionalization with Gluccose Oxidase", J. Phys. Chem. C(Journal of Physical Chemistry C), 2009, vol. 113, No. 32, pp. 14071-14075.

Mattevi.C et al., "Evolution of electrical, chemical, and structural properties of transparent and conducting chemically derived graphene thin films", Adv. Funct. Mater. (Advanced Functional Materials), Jun. 8, 2009, vol. 19, No. 16, pp. 2577-2583.

Zhang.H et al., "Vacuum-assisted synthesis of graphene from thermal exfoliation and reduction of graphite oxide", J. Mater. Chem. (Journal of Materials Chemistry), Apr. 14, 2011, vol. 21, No. 14, pp. 5392-5397.

Park.S et al., "Hydrazine-reduction of graphite-and graphene oxide", Carbon, Mar. 15, 2011, vol. 49, No. 9, pp. 3019-3023, Elsevier.

Dreyer.D et al., "The Chemistry of Graphene Oxide", Chemical Society Reviews, Nov. 3, 2009, vol. 39, No. 1, pp. 228-240.

Wang.L et al., "A facile method of preparing mixed conducting LiFePO4/graphene composites for lithium-ion batteries", Solid State Ionics, Oct. 28, 2010, vol. 181, pp. 1685-1689, Elsevier.

Paredes.J et al., "Graphene Oxide Dispersions In Organic Solvents", Langmuir, 2008, vol. 24, No. 19, pp. 10560-10564.

Du.D et al., "One-step electrochemical deposition of a graphene-ZrO2 nanocomposite : Preparation, characterization and application for detection of organophosphorus agents"J. Mater. Chem. (Journal of Materials Chemistry), 2011, vol. 21, No. 22, pp. 8032-8037.

Jo.G et al., "Large-Scale patterned multi-layer graphene films as transparent conducting electrodes for GaN light-emitting diodes", Nanotechnology, 2010, vol. 21, No. 17, pp. 1-6, IOP Publishing.

\* cited by examiner

POWER STORAGE DEVICE

BACKGROUND OF THE INVENTION

1. Field of the Invention

The present invention relates to a power storage device and a manufacturing method thereof.

2. Description of the Related Art

In recent years, lithium secondary batteries as power storage devices have been widely used as power supplies of consumer electrical devices such as game machines and information terminals typified by mobile phones and smartphones.

For such electrical devices, the need of power storage devices having not only long life and high capacity but also sheet-like shapes and flexibility for reductions in weight and size and a greater freedom for design of outer shapes has been increased. Flexible sheet-like power storage devices can be provided even for curved or bent portions and thin portions such as band portions of wristwatches, clothes, and thin electric alliances.

Lithium secondary batteries which are conventional nonaqueous secondary batteries each generally include positive electrodes and negative electrodes; the positive electrodes each include a positive electrode current collector made of sheet-like aluminum or the like and a positive electrode mix which includes a positive electrode active material capable of occluding and releasing lithium ions and which is applied to both surfaces of the positive electrode current collector, and the negative electrodes each include a negative electrode current collector made of sheet-like copper or the like and a negative electrode mix which includes a negative electrode active material capable of occluding and releasing lithium ions and which is applied to both surfaces of the negative electrode current collector. The positive electrodes and the negative electrodes are rolled with a separator interposed therebetween to form a rolled body, a positive electrode tab and a negative electrode tab are connected to given portions of the positive electrodes and the negative electrodes, and a nonaqueous electrolytic solution and the rolled body where the tabs are connected to the given portions of the positive electrode and the negative electrode are sealed in an exterior body with a certain shape such as a cylindrical shape, a square shape, or a coin shape. Although being flexible, the positive electrode, the separator, and the negative electrode have fixed forms and completely lose their flexibility such as capability of being bent freely, after the rolled body is formed and sealed in a container. Thus, the lithium secondary battery cannot have flexibility of being curved or bent and it is difficult to provide the lithium secondary battery for a curved or bent portion of an electrical device.

Therefore, for example, a solid secondary battery such as the solid secondary battery disclosed in Patent Document 1 has been actively researched. Such a solid secondary battery has a structure where an inorganic solid electrolyte or an organic solid electrolyte is substituted for a conventional nonaqueous electrolytic solution. Specifically, a positive electrode active material, a solid electrolyte, a negative electrode active material, and a negative electrode current collector are provided over a positive electrode current collector and the whole is made to be thin and have flexibility.

REFERENCE

[Patent Document 1] Japanese Published Patent Application No. 2007-123081

SUMMARY OF THE INVENTION

However, such a solid secondary battery has a problem in that an electrolyte layer also needs to be thin, so that a positive electrode and a negative electrode are likely to be short-circuited when the solid secondary battery is curved or bent. In particular, a solid secondary battery is wholly formed using solids and thus flaking of films and cracks in films are caused due to repeated bending of the battery. For this reason, it is not easy to form the solid secondary battery as a sheet-like battery.

Further, solid electrolytes used for solid secondary batteries have various problems and thus have not yet been in practical use.

In view of the above, one embodiment of the present invention provides a sheet-like power storage device which can be curved or bent in at least one axis direction making use of a structure of an nonaqueous secondary battery containing a conventional nonaqueous electrolytic solution, without using a solid secondary battery.

One embodiment of the present invention is a power storage device that includes a power storage element including a plurality of flexible sheet-like positive electrodes each having one end portion fixed to a positive electrode tab; a plurality of flexible sheet-like negative electrodes each having one end portion fixed to a negative electrode tab; and a plurality of flexible sheet-like separators. The positive electrodes and the negative electrodes are alternately stacked so as to overlap with each other with the separator interposed therebetween. The power storage element is sealed in a flexible exterior body.

Another embodiment of the present invention is a power storage device that includes a power storage element including a plurality of flexible sheet-like positive electrodes each having one end portion fixed to a positive electrode tab; a plurality of flexible sheet-like negative electrodes each having one end portion fixed to a negative electrode tab; and a flexible sheet-like separator. The positive electrodes and the negative electrodes are alternately stacked so as to overlap with each other with the separator interposed therebetween. The power storage element is sealed in a flexible exterior body.

The positive electrode includes at least a flexible sheet-like (belt-like) positive electrode current collector and positive electrode mix layers which include positive electrode active materials and which are provided on both surfaces of the positive electrode current collector. Thus, the positive electrode itself also has a sheet-like shape and flexibility. Similarly, the negative electrode includes a flexible sheet-like negative electrode current collector and negative electrode mix layers which include negative electrode active materials and which are provided on both surfaces of the negative electrode current collector. Thus, the negative electrode itself also has a sheet-like shape and flexibility. Note that in the case where the positive electrode mix layer or the negative electrode mix layer is formed of only an active material, the positive electrode mix layer or the negative electrode mix layer refers to a layer formed of only the active material. The positive electrode and the negative electrode overlap with each other with the separator interposed therebetween, whereby charge and discharge capacity can be formed.

Charge and discharge capacity can be increased by alternately stacking the positive electrodes and the negative electrodes with the separator interposed therebetween. However, an increase in the number of stacked layers increases the thickness of the power storage element; thus, it is difficult to curve or bend the power storage element even with the structure of one embodiment of the present invention. Further, the weight of the power storage element is also increased, leading to difficulty in the use for a portable electrical device. Therefore, the number of the positive electrodes and the negative electrodes may be determined as appropriate depending on charge and discharge capacity to be formed and the degree of lightness or flexibility. For example, the total number of the positive electrodes and the negative electrodes each having a thickness in the range of 20 µm to 100 µm is greater than or equal to 5, preferably greater than or equal to 10 and less than or equal to 50.

The separator has a surface in contact with the positive electrode and a surface in contact with the negative electrode which smoothly slide on the positive electrode and the negative electrode when external force is applied, as well as isolating the positive electrode and the negative electrode from each other and being impregnated with an electrolytic solution to have ionic conductivity between the positive electrode and the negative electrode as in a conventional general separator. For this reason, a material having low sliding friction against the positive electrode and the negative electrode which are in contact with the separator (having a low coefficient of friction) or a nonadhesive material is preferably used for the separator. For example, polypropylene or polytetrafluoroethylene (product name: Teflon (registered trademark)) can be used. Further, physical or chemical surface treatment for reducing sliding friction may be performed on a surface of such a material.

One end portion of each of the positive electrode current collectors in the flexible sheet-like positive electrode is physically fixed to a positive electrode tab formed using a conductive material. Only one end portion of each of the positive electrodes is consequently fixed to the positive electrode tab because the other end portion is not fixed. The plurality of sheet-like positive electrodes are fixed to the positive electrode tab so as to be parallel to and overlap with each other; thus, the plurality of sheet-like positive electrodes fixed to the positive electrode tab has a structure similar to that of a book or a notebook including a plurality of sheets which are adhered to a spine. The positive electrode tab may be simply led out to the outside of the exterior body of the power storage device or may be connected to another component led out to the outside of the exterior body.

In a similar manner, one end portion of each of the negative electrode current collectors in the flexible sheet-like negative electrode is physically fixed to a negative electrode tab formed using a conductive material. Only one end portion of each of the negative electrodes is consequently fixed to the negative electrode tab because the other end portion is not fixed. The plurality of sheet-like negative electrodes are fixed to the negative electrode tab so as to be parallel to and overlap with each other. The negative electrode tab may be simply led out to the outside of the exterior body of the power storage device or may be connected to another component led out to the outside of the exterior body.

The positive electrodes and the negative electrodes each having one end portion fixed to the tab and a separator interposed therebetween form charge and discharge capacity. The positive electrodes and the negative electrodes are alternately stacked so as to overlap with each other. The separator may be a plurality of sheets each provided therebetween or one continuous sheet provided therebetween.

When external force is applied to the sheet-like positive electrode and the sheet-like negative electrode, which overlap with each other, of the power storage element having the above structure in the direction facing the surfaces of the positive electrode and the negative electrode, the positive electrode and the negative electrode slide to move on surfaces of the separator since end portions of the positive electrode and the negative electrode which are not connected to the tabs are not fixed, whereby the power storage element can be deformed. Therefore, the power storage element is sealed in the flexible exterior body formed using a laminate film or the like, whereby a power storage device having flexibility in at least one axis direction can be formed.

A high-capacity, sheet-like power storage device having flexibility in at least one axis direction can be provided.

BRIEF DESCRIPTION OF THE DRAWINGS

In the accompanying drawings.

DETAILED DESCRIPTION OF THE INVENTION

Figure 1A:
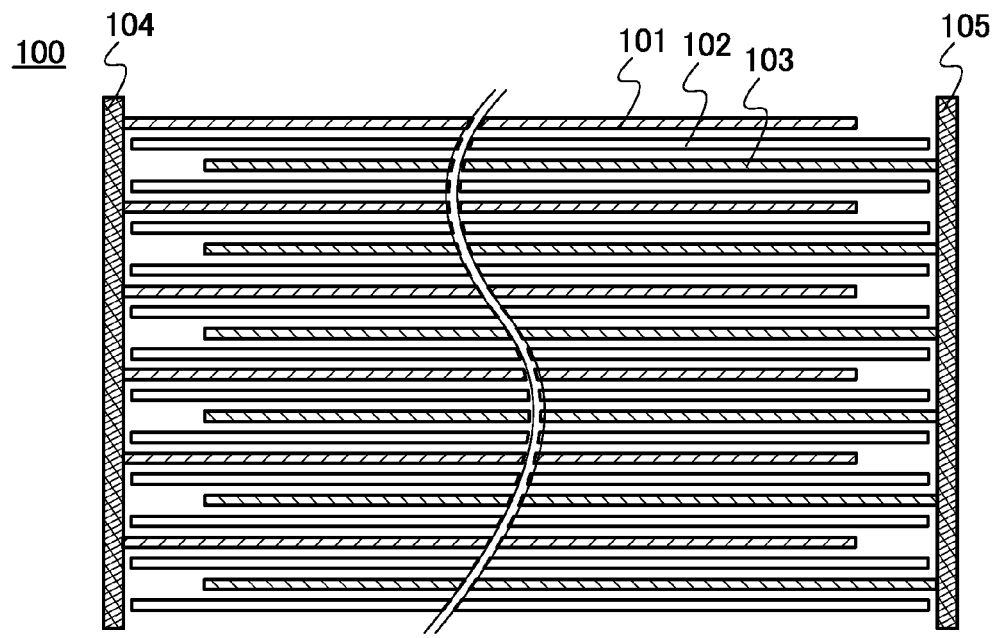
FIGS. 1A and 1B illustrate a power storage element.

Hereinafter, embodiments will be described with reference to drawings. However, the embodiments can be implemented in many different modes, and it will be readily appreciated by those skilled in the art that modes and details thereof can be changed in various ways without departing from the spirit and scope of the present invention. Thus, the present invention should not be interpreted as being limited to the following description of the embodiments.

Note that in each drawing described in this specification, the size, the film thickness, or the region of each component is exaggerated for clarity in some cases. Therefore, embodiments of the present invention are not limited to such scales in the drawings.

Embodiment 1

In this embodiment, a power storage device typified by a lithium secondary battery which has a high capacity and has flexibility in at least one axis direction will be described with reference to FIGS. 1A and 1B.

Note that a lithium secondary battery refers to a secondary battery where lithium ions are used as carrier ions. Examples of carrier ions which can be used instead of lithium ions include alkali-metal ions such as sodium ions and potassium ions; alkaline-earth metal ions such as calcium ions, strontium ions, and barium ions; beryllium ions; and magnesium ions.

FIG. 1A is a cross-sectional view illustrating a power storage element included in a power storage device of this embodiment. A phrase "Power storage device" is used in the present invention for convenience to describe the arrangement and connection structure of a positive electrode and a negative electrode and refers to a structure body including at least a positive electrode, a negative electrode, a separator, a positive electrode tab, and a negative electrode tab. In FIG. 1A, a power storage element 100 includes a plurality of sheet-like positive electrodes 101, a plurality of sheet-like negative electrodes 103, a plurality of sheet-like separators 102, a positive electrode tab 104, and a negative electrode tab 105.

Although not illustrated here, the positive electrode 101 includes at least a positive electrode current collector made of a conductive material, and positive electrode mix layers which include positive electrode active materials capable of occluding and releasing lithium ions or include only positive electrode materials and which are on both surfaces of the positive electrode current collector. Similarly, the negative electrode 103 includes at least a negative electrode current collector made of a conductive material, and negative electrode mix layers which include negative electrode active materials capable of occluding and releasing lithium ions or include only negative electrode materials and which are on both surfaces of the negative electrode current collector.

The positive electrode 101 and the negative electrode 103 which are used in the power storage device of this embodiment are each a flexible sheet-like electrode capable of being curved or bent in at least one axis direction. Thus, a flexible conductive material is used for the positive electrode current collector included in the positive electrode 101. When the positive electrode current collector is curved or bent, the positive electrode mix layer formed on the positive electrode current collector is also curved or bent; thus, a material and the thickness of the positive electrode mix layer are determined as appropriate in consideration of mechanical strength and adhesion to the positive electrode current collector so that the positive electrode mix layer can be curved or bent. The same applies to the negative electrode 103.

The positive electrode 101 and the negative electrode 103 each having a sheet-like shape are overlapped with each other with the separator 102 interposed therebetween, whereby charge and discharge capacity can be formed. The area of a region where the positive electrode 101 and the negative electrode 103 overlap with each other reflects the charge and discharge capacity. Accordingly, in the case of forming a high-capacity power storage device, the areas of the positive electrode 101 and the negative electrode 103 are increased. However, the areas of the sheet-like electrodes are limited depending on the use of a power storage device. In this case, the number of stacked positive and negative electrodes is increased, whereby a similar effect can be obtained.

In this embodiment, charge and discharge capacity is increased by alternately stacking the positive electrodes 101 and the negative electrodes 103 with the separator interposed therebetween. However, when too many electrodes and separators are stacked, the thickness of the power storage element 100 increases, so that curving or bending is difficult even with the structure of one embodiment of the present invention. Further, the weight of the power storage device increases and thus the power storage device might be difficult to be used in a portable electrical device. In view of the above, the number of the positive electrodes 101 and the negative electrodes 103 is determined as appropriate depending on charge and discharge capacity to be formed and the degree of lightness or flexibility. For example, when a stack includes the positive electrode 101 and the negative electrode 103 each having a thickness in the range of 20 µm to 100 µm and two separators, the number of stacks is greater than or equal to 5, preferably greater than or equal to 10 and less than or equal to 50. When the positive electrode current collector and the negative electrode current collector each have a thickness of 10 µm, the positive electrode mix layer and the negative electrode mix layer each have a thickness of 100 µm, and the separator has a thickness of 20 µm, the total thickness is 240 µm. When the number of the stacks is 50, the power storage element has a thickness of 12 mm; thus, the number of the stacks is preferably less than or equal to 50 in order that the power storage element have flexibility.

The separator 102 has a surface in contact with the positive electrode 101 and a surface in contact with the negative electrode 103 which smoothly slide on the positive electrode 101 and the negative electrode 103 when external force is applied, as well as isolating the positive electrode 101 and the negative electrode 103 from each other and being impregnated with an electrolytic solution to have ionic conductivity between the positive electrode 101 and the negative electrode 103 as in a conventional general separator. For this reason, a material having low sliding friction against the positive electrode and the negative electrode which are in contact with the separator 102 (having a low coefficient of friction) or a nonadhesive material is preferably used for the separator 102. For example, polypropylene or polytetrafluoroethylene can be used. Further, physical or chemical surface treatment for reducing sliding friction may be performed on a surface of such a material.

In this embodiment, each separator 102 has a sheet-like shape substantially the same as shapes of the positive electrode 101 and the negative electrode 103 in plan view and is provided between the positive electrode 101 and the negative electrode 103 so as to be substantially parallel to the positive electrode 101 and the negative electrode 103. Thus, the separators 102 are as many as gaps each of which is between the positive electrode 101 and the negative electrode 103.

The plane shape of the sheet-like positive electrode 101 is, for example, a rectangle having two long opposite sides. However, the plane shape of the sheet-like positive electrode 101 can be selected freely depending on the use, e.g., an electrical device where the power storage device is mounted. For example, the plane shape of the sheet-like positive electrode 101 may be a trapezoid or any two-dimensional shape with a certain area such as a triangle, a polygon, a circle, or an ellipse. The positive electrode current collector is physically fixed to the positive electrode tab 104 formed of a conductive material at one end portion of the positive electrode 101. For example, when the plane shape of the positive electrode 101 is a rectangle, one of the short sides thereof can be the end portion. Even when any of the other plane shapes is employed, a given portion can be one end portion in order to partly fix the plurality of the positive electrodes 101. Only one end portion of the positive electrode 101 is consequently fixed to the positive electrode tab 104 because the other end portions are not fixed.

In this manner, the plurality of sheet-like positive electrodes 101 are fixed to the positive electrode tab 104 to be bound so as to be parallel to and overlap with each other; thus, the plurality of sheet-like positive electrodes 101 fixed to the positive electrode tab 104 has a structure similar to that of a book or a notebook including a plurality of sheets which are adhered to a spine.

Similarly, the negative electrode 103 is physically fixed to the negative electrode tab 105 formed of a conductive material at one end portion of the negative electrode 103. Only one end portion of the negative electrode 103 is consequently fixed to the negative electrode tab 105 because the other end portion is not fixed. The plurality of sheet-like negative electrodes 103 are fixed to the negative electrode tab 105 to be bound so as to be parallel to and overlap with each other.

The positive electrode tab 104 and the negative electrode tab 105 are connection terminals for inputting and outputting electric power and function as a positive electrode terminal and a negative electrode terminal, respectively. Thus, a conductive material having a low resistance is used for the positive electrode tab 104 and the negative electrode tab 105. For the power storage element 100 including the positive electrode tab 104 and the negative electrode tab 105, a material which is nonreactive with an electrolytic solution is used because the entire power storage element 100 is immersed in an electrolytic solution (not illustrated). For the positive electrode tab 104 and the negative electrode tab 105, for example, a metal such as stainless steel, gold, platinum, zinc, iron, copper, aluminum, or titanium, or an alloy thereof can be used. The positive electrode tab 104 and the negative electrode tab 105 may be simply led out to the outside of an exterior body of the power storage device. Alternatively, the positive electrode tab 104 and the negative electrode tab 105 may be connected to another conductive component and the conductive component may be led out to the outside of an exterior body.

The power storage element 100 has a structure where the plurality of flexible sheet-like positive electrodes 101 each of which has one end portion fixed to the positive electrode tab 104 and the plurality of flexible sheet-like negative electrodes 103 each of which has one end portion fixed to the negative electrode tab 105 are alternately stacked with the separator 102 interposed therebetween as described above, so that the power storage element 100 and the power storage device including the power storage element 100 can have flexibility in at least one axis direction. That is to say, the positive electrode 101, the separator 102, and the negative electrode 103 in the power storage element 100 are not fixed to each other and the surfaces of the positive electrode 101 and the negative electrode 103 are simply in contact with the surfaces of the separator 102; thus, when external force is applied, the positive electrode 101 and the negative electrode 103 each having flexibility can slide on the surfaces of the separator 102 to move in respective directions in which the external force is absorbed or relieved. Further, since the positive electrode 101, the negative electrode 103, and the separator 102 are flexible sheets, each of them receives the external force to be deformed at the time of the movement. Accordingly, the stack of the positive electrode 101, the negative electrode 103, and the separator 102 is wholly curved or bent due to external force; thus, the power storage element 100 can have flexibility in at least one axis direction.

"One axis direction" refers to the direction perpendicular to a plane where the positive electrode 101, the negative electrode 103, and the separator 102 overlap with each other. "At least one axis direction" refers to directions including at least the perpendicular direction. Thus, when force is applied to the roughly sheet-like power storage element 100 of this embodiment from above or below, the power storage element 100 is curved or bent upward or downward due to the applied force, and when force is applied to the power storage element 100 in the direction in which the power storage element 100 is twisted, the power storage element 100 can be deformed in the direction in response.

Figure 1B:
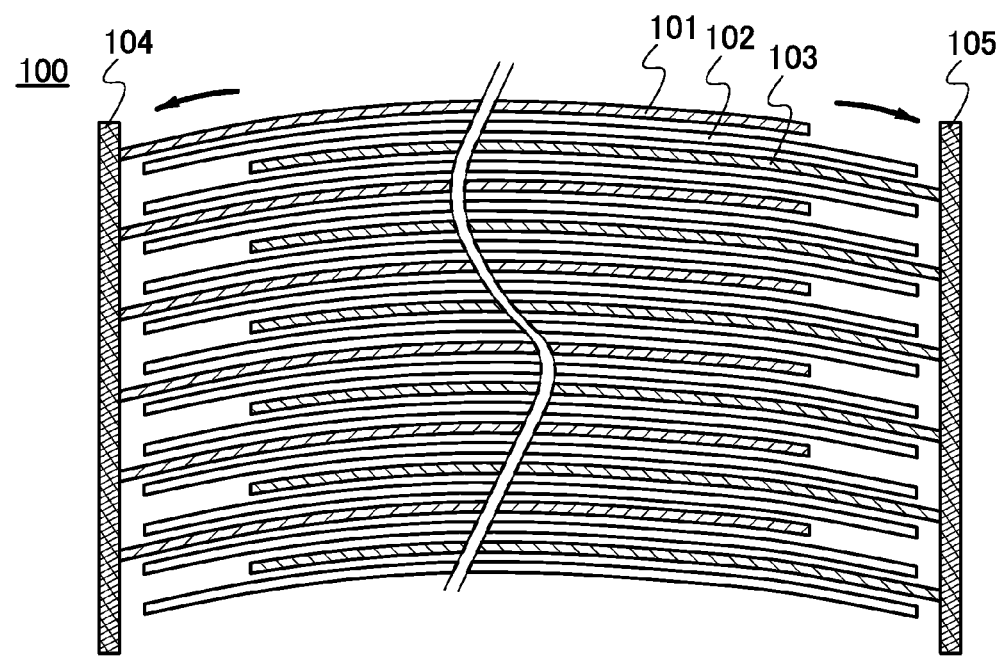

For example, FIG. 1B illustrates the power storage element 100 bent when force is applied to the power storage element 100 from below. In this case, the positive electrode 101, the negative electrode 103, and the separator 102 are curved upward, the positive electrode 101 moves to the left while sliding on the surface of the separator 102 in contact with the positive electrode 101, and the negative electrode 103 moves to the right while sliding on the surface of the separator 102 in contact with the negative electrode 103. Thus, the power storage element 100 is deformed to be warped upward. With such movement, the flexibility is provided to the power storage element so that external force is absorbed or relieved, and high charge and discharge capacity is maintained.

The distance between the positive electrode tab 104 and the negative electrode tab 105 is substantially fixed. Thus, even when external force is applied to the power storage element 100, the distance between the positive electrode tab 104 and the negative electrode tab 105 is substantially constant. Accordingly, the positive electrode 101 and the negative electrode 103 are not brought into contact with the negative electrode tab 105 and the positive electrode tab 104, respectively, so that an electrical short circuit does not occur. Further, the distance between the positive electrode tab 104 and the negative electrode tab 105 does not significantly increase, so that a region where the positive electrode 101 and the negative electrode 103 overlap with each other is not decreased and charge and discharge capacity is not significantly reduced, and there is no possibility that the positive electrodes 101 bound with the positive electrode tab 104 and the negative electrodes 103 bound with the negative electrode tab 105 are distant from each other so that the overlapping region is lost.

Selection of materials of the positive electrode, the negative electrode, and the like included in the power storage element 100 allows the power storage element 100 bent once to return to its original shape.

Note that in the power storage element 100 without the separator 102 as an embodiment different from this embodiment, a liquid electrolyte is provided in a gap and hardened with the power storage element 100 curved or bent, whereby a curved or bent power storage device can be formed although it does not have flexibility.

Thus, since the positive electrode 101 and the negative electrode 103 except end portions which are connected to the positive electrode tab 104 and the negative electrode tab 105, respectively, are not fixed, when external force is applied to the sheet-like positive electrode 101 and the sheet-like negative electrode 103 which overlap with each other, the positive electrode 101 and the negative electrode 103 slide to move on surfaces of the separator 102, whereby the power storage element 100 can be deformed. Therefore, the power storage element 100 is sealed in a flexible exterior body formed using a laminate film or the like, whereby a power storage device having flexibility in at least one axis direction can be formed.

This embodiment can be implemented in combination with any of the other embodiments as appropriate.

Embodiment 2

In this embodiment, an example of using one continuous separator instead of the plurality of separators in the power storage element described in Embodiment 1 will be described with reference to FIGS. 2A and 2B.

Figure 2A:
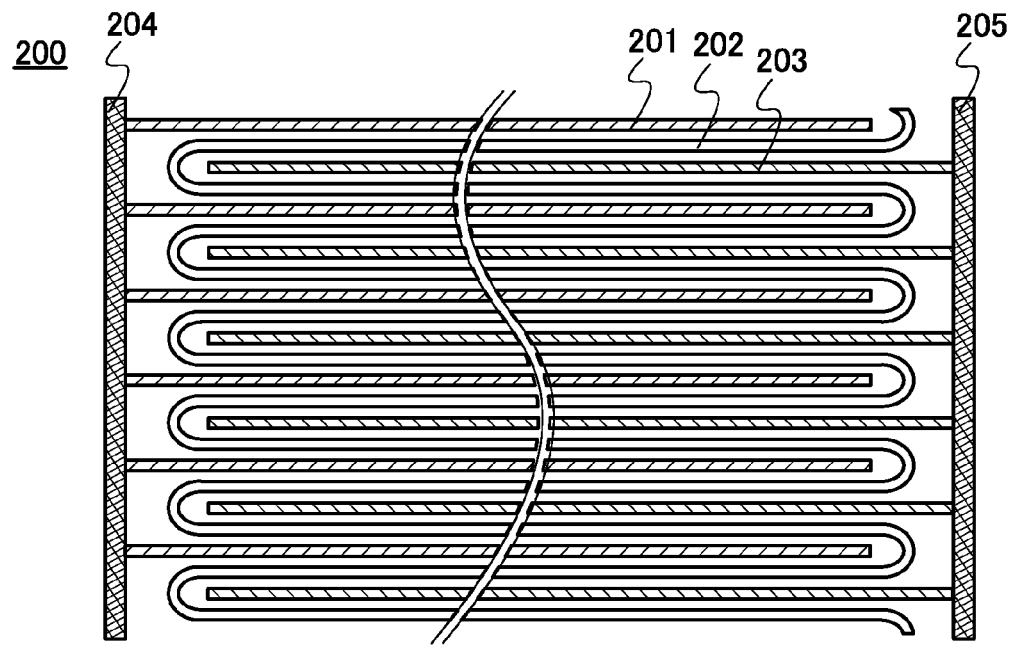
FIGS. 2A and 2B illustrate a power storage element.

FIG. 2A is a cross-sectional view illustrating a power storage element 200 included in a power storage device of this embodiment. In FIG. 2A, the power storage element 200 includes a plurality of sheet-like positive electrodes 201, a plurality of sheet-like negative electrodes 203, a common separator 202, and a positive electrode tab 204, and a negative electrode tab 205.

The structure of the power storage element 200 is similar to the structure of the power storage element 100 described in Embodiment 1 except that the separator 202 is one continuous sheet.

Specifically, one end portion of each of the plurality of flexible sheet-like positive electrodes 201 is fixed to the positive electrode tab 204, and one end portion of each of the plurality of flexible sheet-like negative electrodes 203 is fixed to the negative electrode tab 205. The positive electrodes 201 and the negative electrodes 203 are alternately stacked so as to overlap with each other with the common separator 202 interposed therebetween. The separator 202 is provided between the positive electrodes 201 and the negative electrodes 203 so as to meander in cross section as illustrated in FIG. 2A.

Figure 2B:
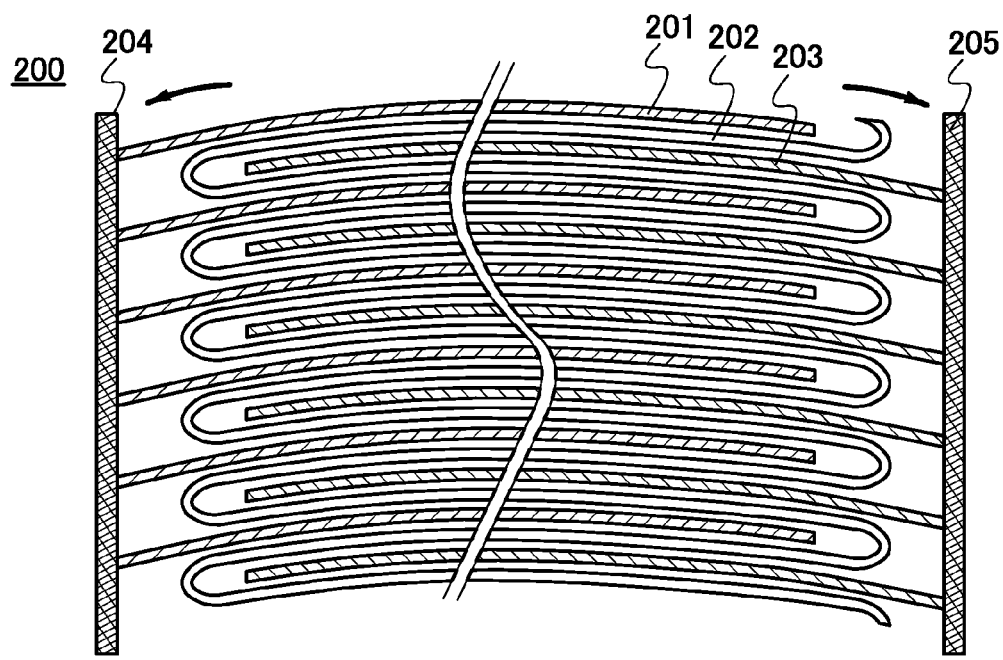

Thus, even in the case where the separator 202 is one continuous sheet, the power storage element 200 can have flexibility as illustrated in FIG. 2B. For example, when external force is applied to the power storage element 200 from below, the positive electrode 201 slides on a surface of the separator 202 to move to the left and the negative electrode 203 slides on a surface of the separator 202 to move to the right. Being a flexible sheet, the separator 202 is also curved upward by external force; however, the separator 202 is not changed in response to the sliding of the positive electrode 201 and the negative electrode 203 because the separator 202 has a low coefficient of sliding friction against the positive electrode 201 and the negative electrode 203 and is nonadhesive.

In the above manner, the storage element 200 of this embodiment can also be made to have flexibility as in Embodiment 1. Particularly in the structure described in this embodiment, the separator 202 is continuous; thus, end portions of the positive electrode 201 and the negative electrode 203 which are opposite to end portions fixed to the positive electrode tab 204 and the negative electrode tab 205 are surrounded by the separator 202. This can structurally prevent the positive electrode 201 and the negative electrode 203 from being in contact with the negative electrode tab 205 and the positive electrode tab 204, respectively, not to cause an electrical short circuit.

This embodiment can be implemented in combination with any of the other embodiments as appropriate.

Embodiment 3

In this embodiment, a power storage device including the power storage element described in Embodiment 1 or Embodiment 2 will be described with reference to FIGS. 3A and 3B and FIGS. 4A and 4B.

Figure 3A:
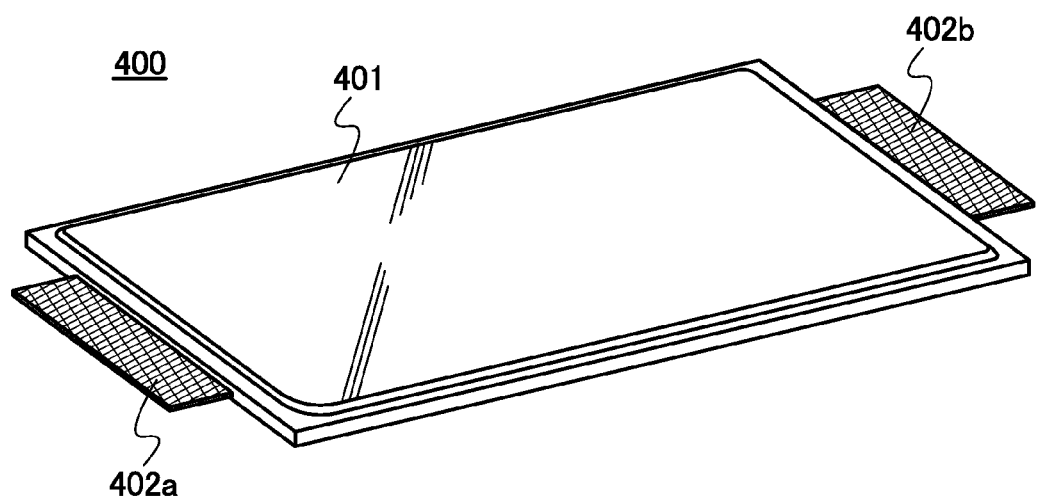
FIGS. 3A and 3B illustrate a power storage device.
Figure 3B:
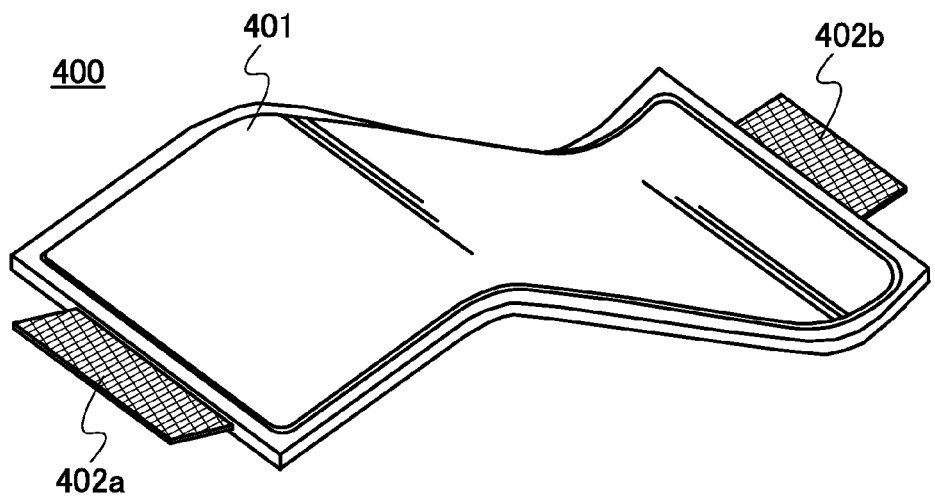

FIGS. 3A and 3B are overhead views each illustrating a power storage device including the power storage element 100 in Embodiment 1 or the power storage element 200 in Embodiment 2.

FIG. 3A illustrates a power storage device 400 in an initial state which is not curved or bent. In this embodiment, the power storage device 400 is a thin rectangular sheet shape with long sides and short sides. A positive electrode tab 402a and a negative electrode tab 402b are led out from the opposite short sides of the power storage device 400. The power storage element 100 in Embodiment 1 or the power storage element 200 in Embodiment 2 and an electrolytic solution are sealed in the power storage device 400. The positive electrode tab 402a and the negative electrode tab 402b are combined with a positive electrode tab and a negative electrode tab in the power storage element, respectively, or are connected to the positive electrode tab and the negative electrode tab in the power storage element, respectively, as separate components.

In the power storage device 400, the power storage element and the electrolytic solution are sealed in an exterior body 401. The exterior body 401 has a flexible bag-like shape in which the power storage element 100 or 200 and the electrolytic solution can be sealed and has a certain level of strength as an exterior of the sheet-like power storage device 400. In addition, the exterior body 401 needs to be resistant to an electrolytic solution contained therein. As the exterior body 401, for example, a laminate film having a three-layer structure where a highly flexible metal thin film of aluminum, stainless steel, copper, nickel, or the like is provided over the inner surface of a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of an electrolytic solution and a gas can be blocked and an insulating property and resistance to the electrolytic solution can be obtained.

As a solute of the electrolytic solution, a material including carrier ions is used. Typical examples of the solute of the electrolytic solution include lithium salts such as $LiClO_4$, $LiAsF_6$, $LiBF_4$, $LiPF_6$, and $Li(C_2F_5SO_2)_2N$.

Note that when carrier ions are alkali metal ions other than lithium ions, alkaline-earth metal ions, beryllium ions, or magnesium ions, instead of lithium in the above lithium salts, an alkali metal (e.g., sodium or potassium), an alkaline-earth metal (e.g., calcium, strontium, or barium), beryllium, or magnesium may be used for a solute of the electrolytic solution.

As a solvent of the electrolytic solution, a material in which lithium ions can transfer is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Further, a lithium secondary battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolytic solution can prevent a lithium secondary battery from exploding or catching fire even when the lithium secondary battery internally shorts out or the internal temperature increases owing to overcharging or the like.

Although the power storage device 400 is two-dimensionally rectangular in FIG. 3A, any other shape having a certain area, such as a trapezoid, a polygon, a circle, or an ellipse, may be designed as appropriate.

Although the positive electrode tab 402a and the negative electrode tab 402b are provided on opposite sides in FIG. 3A, the tabs may be led from the power storage element with a wiring or the like to be provided on the same side.

Next, FIG. 3B illustrates the power storage device 400 which is curved or bent. In FIG. 3B, the power storage device 400 is curved upward on the positive electrode tab 402a side and curved downward on the negative electrode tab 402b side. Even when the power storage device 400 is curved in such a manner, the positive electrode and the negative electrode of the power storage element included in the power storage device 400 slide to move to roughly the left and the right (in the direction of a segment connecting the positive electrode tab and the negative electrode tab) as described in Embodiments 1 and 2; thus, the power storage device 400 can be curved while maintaining charge and discharge capacity. Since the stack of positive electrodes and the stack of negative electrodes in the power storage device 400 slide in response to curving, the power storage device 400 can be consequently curved to have the shape illustrated in FIG. 3B.

Note that the power storage device 400 described in this embodiment can be curved or bent upward or downward (in one axis direction) in FIGS. 3A and 3B and can be deformed in response to a certain degree of twisting. This is because the positive electrode and the negative electrode except one end portion of each of the positive electrode and the negative electrode are not fixed so as to have flexibility to move.

Next, the inner structure of the power storage device 400 of this embodiment will be described with reference to FIGS. 4A and 4B.

Figure 4A:
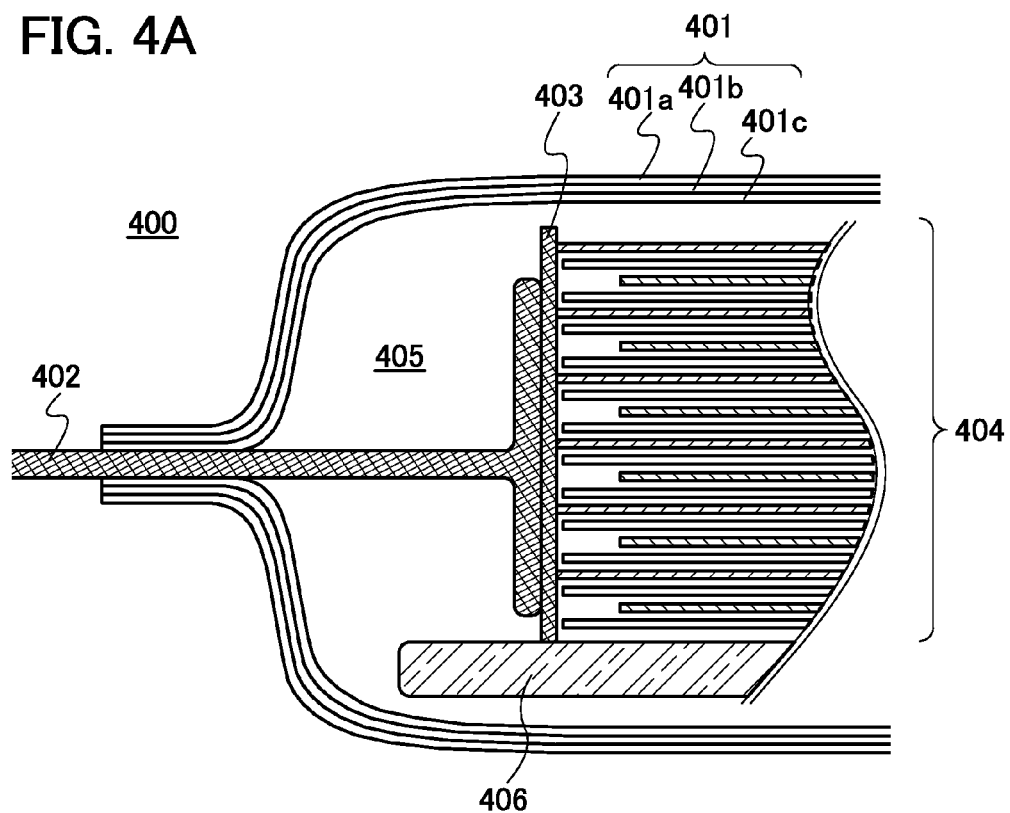
FIGS. 4A and 4B illustrate power storage devices.

FIG. 4A is a cross-sectional view of the power storage device 400 which shows the vicinity of positive electrodes enlarged. A positive electrode portion and a negative electrode portion are roughly symmetric in the schematic view; thus, the negative electrode portion is not illustrated.

In the power storage device 400, a power storage element 404 is sealed in the exterior body 401. The power storage element 404 is formed by alternately stacking the positive electrodes and the negative electrodes with a separator interposed therebetween as described above. One end portion of each of the plurality of positive electrodes is fixed to a positive electrode tab 403, and one end portion of each of the plurality of negative electrodes is fixed to the negative electrode tab although not illustrated. The positive electrode tab 403 is led out to the outside of the exterior body 401. In FIG. 4A, the positive electrode tab 403 connected to the plurality of positive electrodes is connected to the positive electrode tab 402 led out to the outside of the exterior body 401. However, a structure where the tab is led out to the outside of the exterior body 401 is not limited to this; for example, the positive electrode tab 403 and the positive electrode tab 402 may be combined and led out to the outside of the exterior body 401, and one or a plurality of different conductive materials may be provided between the positive electrode tab 403 and the positive electrode tab 402 for electrical connection. The same applies to the negative electrode.

A supporting board 406 is provided on the bottom surface of the power storage element 404. The supporting board 406 is physically connected to the bottom portions of the positive electrode tab 403 and the negative electrode tab (not illustrated). The supporting board 406 can fix the positive electrode tab and the negative electrode tab, so that the distance between the positive electrode tab and the negative electrode tab can be roughly fixed even in the case where the power storage element 404 is curved or bent. Thus, there is no possibility that the positive electrode and the negative electrode are brought into contact with the negative electrode tab and the positive electrode tab, respectively, and a short circuit is caused. Further, there is no possibility that the distance between the positive electrode tab and the negative electrode tab is significantly increased so that an overlapping region of the positive electrode and the negative electrode is lost in the exterior body 401.

The positive electrode, the negative electrode, the separator, and the exterior body 401 included in the power storage element 404 each have flexibility and thus cannot keep a flat sheet shape in the initial state in some cases depending on materials selected for them; for example, they may be curved by gravity. The supporting board 406 provided on the bottom surface of the power storage element 404 can support the power storage element 404.

The supporting board is formed using a material which is not curved as much as possible by its own weight or fixing of the power storage element 404 and has flexibility to be curved or bent by intentional bending. Either a conductive material or an insulating material can be used as long as the above condition is satisfied. For example, a copper plate with a given thickness or a rubber with a given strength may be used. In the case where a conductive material is used for the supporting board 406, an insulating material needs to be used for at least portions to which the positive electrode tab and the negative electrode tab are fixed, in order to prevent a short circuit between the positive electrode tab and the negative electrode tab. Alternatively, the supporting board 406 may be formed using a metal core and an insulating material covering the metal core or a structure body having a portion which is movable in at least one axis direction.

The exterior body 401 has a flexible bag-like shape in which the power storage element 404 and the electrolytic solution 405 can be sealed and has a certain level of strength as an exterior of the sheet-like power storage device 400 capable of being curved or bent. In addition, the exterior body 401 needs to be resistant to an electrolytic solution contained therein. As the exterior body 401, for example, a laminate film having a three-layer structure where a highly flexible metal thin film 401b of aluminum, stainless steel, copper, nickel, or the like is provided over an insulating film 401c formed using a material such as polyethylene, polypropylene, polycarbonate, ionomer, or polyamide, and an insulating synthetic resin film 401a of a polyamide resin, a polyester resin, or the like is provided as the outer surface of the exterior body over the metal thin film can be used. With such a three-layer structure, permeation of an electrolytic solution and a gas can be blocked and an insulating property and resistance to the electrolytic solution can be obtained.

Figure 4B:
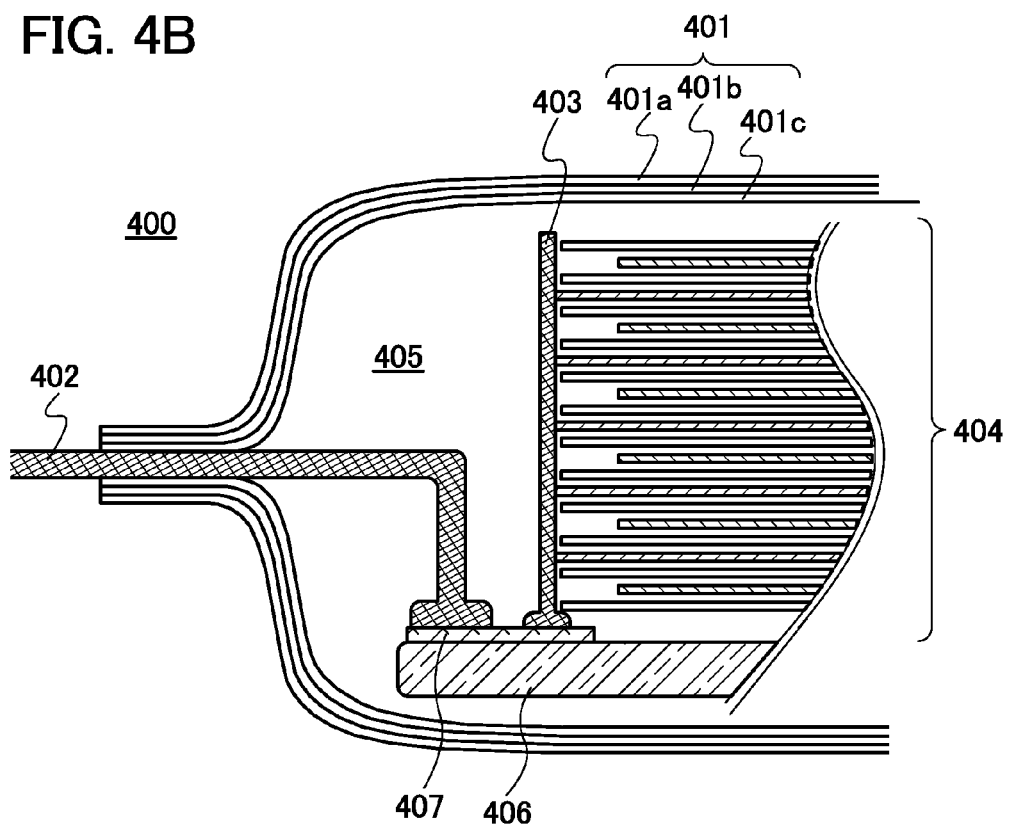

FIG. 4B is a cross-sectional view of the power storage device 400 which is different from that in FIG. 4A and shows the vicinity of positive electrodes enlarged as in FIG. 4A. A positive electrode portion and a negative electrode portion are roughly symmetric in the schematic view; thus, the negative electrode portion is not illustrated.

In FIG. 4B, an insulating material is used for the supporting board 406 and the positive electrode tab 403 is electrically connected to the positive electrode tab 402 led out to the outside of the exterior body 401 through a wiring 407 provided over the supporting board 406. For the wiring 407, a material which is nonreactive with the electrolytic solution 405 needs to be selected because the wiring 407 is in direct contact with the electrolytic solution 405. For the wiring 407, for example, a metal such as stainless steel, gold, platinum, zinc, iron, copper, aluminum, or titanium, or an alloy thereof can be used. Note that the wiring 407 except end portions connected to the positive electrode tabs 402 and 403 may be covered with an insulating material.

In the structure illustrated in FIG. 4B, the positive electrode tab 402 is connected to the supporting board 406 through the wiring 407 and is not direct contact with the power storage element 404, so that force applied to the positive electrode tab 402 located outside the exterior body 401 can be prevented from being directly applied to the power storage element 404.

This embodiment can be implemented in combination with any of the other embodiments as appropriate.

Embodiment 4

In this embodiment, the structure and manufacturing method of a lithium secondary battery including any of the power storage elements described in Embodiments 1 to 3 will be described.

(Positive Electrode and Formation Method Thereof)

Figure 5A:
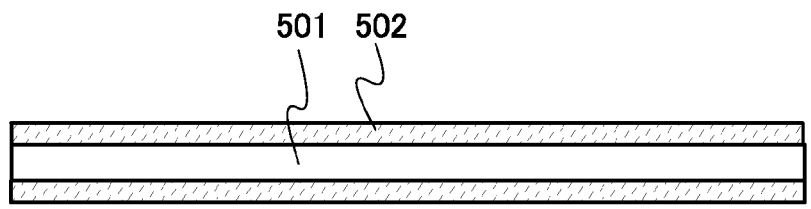
FIGS. 5A to 5C illustrate a positive electrode.

First, a positive electrode and a formation method thereof will be described. FIG. 5A is a cross-sectional view of a positive electrode 500. In the positive electrode 500, positive electrode mix layers 502 are formed on a positive electrode current collector 501.

For the positive electrode current collector 501, a highly conductive material such as a metal typified by stainless steel, gold, platinum, zinc, iron, copper, aluminum, or titanium, or an alloy thereof can be used. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 501 can have a foil-like shape, a plate-like shape (sheet-like shape), a net-like shape, a punching-metal shape, an expanded-metal shape, or the like as appropriate.

As the positive electrode material in the positive electrode mix layer 502, a material into and from which lithium ions can be inserted and extracted can be used; for example, a lithium-containing composite oxide with an olivine crystal structure, a layered rock-salt crystal structure, or a spinel crystal structure cans be used.

An example of an olivine-type lithium-containing composite oxide is $LiMPO_4$ (general formula) (M is one or more of Fe(II), Mn(II), Co(II), and Ni(II)). Typical examples of $LiMPO_4$ (general formula) are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly satisfies conditions necessary for the positive electrode active material, such as safety, stability, high capacity density, high potential, and the existence of lithium ions which can be extracted in initial oxidation (charging).

Examples of a lithium-containing composite oxide with a layered rock-salt crystal structure are lithium cobalt oxide ($LiCoO_2$), $LiNiO_2$, $LiMnO_2$, $Li_2MnO_3$, NiCo-containing composite oxide (general formula: $LiNi_xCo_{1-x}O_2$ (0<x<1)) such as $LiNi_{0.8}Co_{0.2}O_2$, NiMn-containing composite oxide (general formula: $LiNi_xMn_{1-x}O_2$ (0<x<1)) such as $LiNi_{0.5}Mn_{0.5}O_2$, NiMnCo-containing composite oxide (also referred to as NMC) (general formula: $LiNi_xMn_yCo_{1-x-y}O_2$ (x>0, y>0, x+y<1)) such as $LiNi_{1/3}Mn_{1/3}Co_{1/3}O_2$, $Li(Ni_{0.8}Co_{0.15}Al_{0.05})O_2$, and $Li_2MnO_3$—$LiMO_2$ (M=Co, Ni, or Mn).

$LiCoO_2$ is particularly preferable because of its advantages such as high capacity and stability in the air higher than that of $LiNiO_2$ and thermal stability higher than that of $LiNiO_2$.

Examples of a lithium-containing composite oxide with a spinel crystal structure are $LiMn_2O_4$, $Li_{1+x}Mn_{2-x}O_4$, $Li(MnAl)_2O_4$, and $LiMn_{1.5}Ni_{0.5}O_4$.

It is preferable to add a small amount of lithium nickel oxide ($LiNiO_2$ or $LiNi_{1-x}MO_2$ (M=Co, Al, or the like)) to lithium-containing composite oxide with a spinel crystal structure which contains manganese such as $LiMn_2O_4$ because advantages such as minimization of the elution of manganese and the decomposition of an electrolytic solution can be obtained.

Alternatively, a composite oxide expressed by $Li_{(2-j)}MSiO_4$ (general formula) (M is one or more of Fe(II), Mn(II), Co(II), and Ni(II), 0≤j≤2) can be used as the positive electrode active material. Typical examples of $Li_{(2-j)}MSiO_4$ (general formula) are $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$, (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used as the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ or $FeF_3$, a metal chalcogenide (a sulfide, a selenide, or a telluride) such as $TiS_2$ or $MoS_2$, a lithium-containing composite oxide with an inverse spinel crystal structure such as $LiMVO_4$, a vanadium oxide ($V_2O_5$, $V_6O_{13}$, $LiV_3O_8$, or the like), a manganese oxide, an organic sulfur, or the like can be used as the positive electrode active material.

In the case where carrier ions are alkali metal ions other than lithium ions, alkaline-earth metal ions, beryllium ions, or magnesium ions, the following may be used for the positive electrode mix layer 502: a composite oxide obtained by substituting an alkali metal (e.g., sodium or potassium), an alkaline-earth metal (e.g., calcium, strontium, or barium), beryllium, or magnesium for lithium in the lithium compound or the lithium-containing composite oxide.

The positive electrode mix layers 502 are not necessarily formed in direct contact with both surfaces of the positive electrode current collector 501. The following functional layers may be formed using a conductive material such as a metal between the positive electrode current collector 501 and the positive electrode mix layer 502: an adhesion layer for increasing the adhesion between the positive electrode current collector 501 and the positive electrode mix layer 502; a planarization layer for reducing the roughness of the surface of the positive electrode current collector 501; a heat radiation layer; a stress relaxation layer for reducing the stress on the positive electrode current collector 501 or the positive electrode mix layer 502; or the like.

Figure 5B:
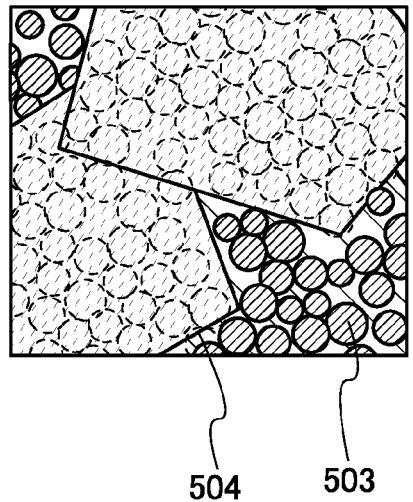

FIG. 5B is a plan view of the positive electrode mix layer 502 including particulate positive electrode active materials 503 capable of occluding and releasing carrier ions, and graphenes 504 which cover a plurality of the positive electrode active materials 503 and at least partly surround the plurality of the positive electrode active materials 503. The different graphenes 504 cover surfaces of the plurality of the positive electrode active materials 503. Note that the positive electrode active materials 503 may partly be exposed.

Graphene is, in a narrow sense, a lateral layer in graphite, i.e., a carbon layer in which six-membered rings each composed of carbon atoms are connected in the planar direction, and in other words, graphene refers to a one-atom-thick sheet of carbon molecules having π bonds. In particular, a stack of 2 or more and 100 or less carbon layers, which is referred to as multilayer graphene in some cases, is also included in the category of graphene. Graphene oxide refers to a compound formed by oxidation of such graphene. When graphene oxide is reduced to form graphene, oxygen contained in the graphene oxide is not entirely released and part of the oxygen remains in the graphene. When the graphene contains oxygen, the proportion of the oxygen is higher than or equal to 2 atomic % and lower than or equal to 20 atomic %, preferably higher than or equal to 3 atomic % and lower than or equal to 15 atomic %.

In the case where graphene is multilayer graphene including graphene obtained by reducing graphene oxide, the interlayer distance between graphenes is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single-layer graphenes is 0.34 nm. Since the interlayer distance between the graphenes used for the power storage device of one embodiment of the present invention is longer than that in general graphite, carrier ions can easily transfer between the graphenes in multilayer graphene.

Graphene is chemically stable and has favorable electric characteristics. Graphene has high conductivity because six-membered rings each composed of carbon atoms are connected in the planar direction. That is, graphene has high conductivity in the planar direction. Graphene has a sheet-like shape and a gap is provided between stacked graphene layers in the direction parallel to the plane, so that ions can transfer in the gap. However, the transfer of ions in the direction perpendicular to the graphene layers is difficult.

The particle size of the positive electrode active material 503 is preferably greater than or equal to 20 nm and less than or equal to 100 nm. Note that the particle size of the positive electrode active material 503 is preferably smaller because electrons transfer in the positive electrode active materials 503.

Sufficient characteristics can be obtained even when surfaces of the positive electrode active materials 503 are not covered with a graphite layer; however, it is preferable to use both the graphene and the positive electrode active material covered with a graphite layer because carriers hop between the positive electrode active materials and current flows.

Figure 5C:
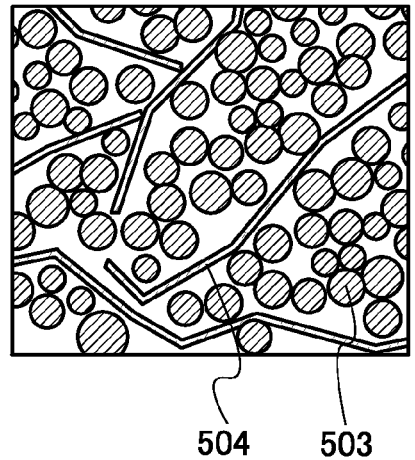

FIG. 5C is a cross-sectional view of a part of the positive electrode mix layer 502 in FIG. 5B. The positive electrode mix layer 502 includes the positive electrode active materials 503 and the graphenes 504 which cover a plurality of the positive electrode active materials 503. The graphenes 504 are observed to have linear shapes in the cross-sectional view. A plurality of the positive electrode active materials are at least partly surrounded with one graphene or a plurality of the graphenes or sandwiched between a plurality of the graphenes. Note that the graphene has a bag-like shape, and a plurality of the positive electrode active materials is surrounded with the bag-like portion in some cases. In addition, part of the positive electrode active materials is not covered with the graphenes and exposed in some cases.

The desired thickness of the positive electrode mix layer 502 is determined to be greater than or equal to 20 μm and less than or equal to 100 μm. It is preferable to adjust the thickness of the positive electrode mix layer 502 as appropriate so that a crack and flaking are not caused.

Note that the positive electrode mix layer 502 may include acetylene black particles having a volume 0.1 times to 10 times as large as that of the graphene, carbon particles having a one-dimensional expansion such as carbon nanofibers, or other known conductive additives.

As an example of the positive electrode active material 503, a material whose volume is expanded by occlusion of ions serving as carriers is given. When such a material is used, the positive electrode mix layer gets vulnerable and is partly collapsed by charge and discharge, resulting in lower reliability of a power storage device. However, the graphene covering the periphery of the positive electrode active materials allows prevention of dispersion of the positive electrode active materials and the collapse of the positive electrode mix layer, even when the volume of the negative electrode active materials is increased and decreased due to charge and discharge. That is to say, the graphene has a function of maintaining the bond between the positive electrode active materials even when the volume of the positive electrode active materials is increased and decreased by charge and discharge.

The graphene 504 is in contact with a plurality of the positive electrode active materials 503 and serves also as a conductive additive. Further, the graphene 504 has a function of holding the positive electrode active materials 503 capable of occluding and releasing carrier ions. Thus, a binder does not have to be mixed into the positive electrode mix layer. Accordingly, the proportion of the positive electrode active materials in the positive electrode mix layer can be increased, which allows an increase in charge and discharge capacity of a power storage device.

Next, a method for forming the positive electrode mix layers 502 will be described.

Slurry containing particulate positive electrode active materials and graphene oxide is formed. Then, the slurry is applied to both surfaces of the positive electrode current collector 501. After that, heating is performed in a reducing atmosphere for reduction treatment so that the positive electrode active materials are baked and part of oxygen is released from graphene oxide to form openings in graphene. Note that oxygen in the graphene oxide is not entirely released and partly remains in graphene.

Through the above steps, the positive electrode mix layers 502 can be formed to have a predetermined shape on the positive electrode current collector 501. Consequently, the positive electrode mix layer has higher conductivity. Graphene oxide contains oxygen and thus is negatively charged in a polar liquid. As a result of being negatively charged, graphene oxide is dispersed. Accordingly, the positive electrode active materials contained in the slurry are not easily aggregated, so that the size of the particle of the positive electrode active material can be prevented from increasing. Thus, the transfer of electrons in the positive electrode active materials is facilitated, resulting in an increase in conductivity of the positive electrode mix layer.

After being formed on the positive electrode current collector 501, the positive electrode mix layers 502 are rolled with a roller press machine, whereby the positive electrode 500 is formed.

(Negative Electrode and Formation Method Thereof)

Next, a negative electrode and a formation method thereof will be described reference to FIG. 6A.

Figure 6A:
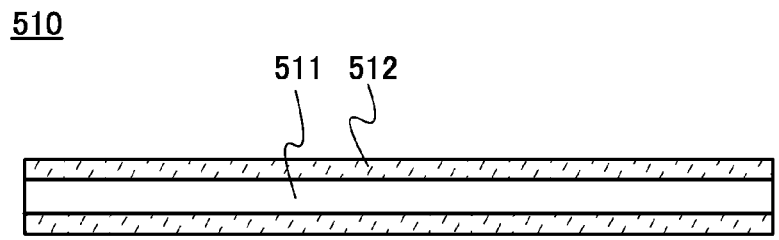
FIGS. 6A to 6D illustrate a negative electrode.

As illustrated in FIG. 6A, the negative electrode 510 includes a negative electrode current collector 511, and negative electrode mix layers 512 provided on both surfaces of the negative electrode current collector 511.

The negative electrode current collector 511 is formed using a highly conductive material such as metal. As the highly conductive material, stainless steel, iron, aluminum, copper, nickel, or titanium can be used, for example. The negative electrode current collector 511 can have a foil shape, a plate shape (sheet shape), a net shape, a punching-metal shape, an expanded-metal shape, or the like as appropriate.

The negative electrode mix layers 512 are provided on both surfaces of the negative electrode current collector 511. The negative electrode mix layer 512 is formed using a negative electrode active material capable of occluding and releasing carrier ions.

As a negative electrode active material, an alloy-based material which enables charge-discharge reaction by alloying and dealloying reaction with a lithium metal can be used. For example, a material containing at least one of Al, Si, Ge, Sn, Pb, Sb, Bi, Ag, Zn, Cd, In, Ga, and the like can be given. Such elements have higher capacity than carbon. In particular, silicon has a significantly high theoretical capacity of 4200 mAh/g. For this reason, silicon is preferably used as the negative electrode active material. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, as the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting lithium ions in advance In the case where silicon is used for the negative electrode active material, amorphous silicon, microcrystalline silicon, polycrystalline silicon, or a combination thereof can be used. In general, silicon with higher crystallinity has higher electric conductivity of silicon is higher; thus, silicon with high crystallinity can be used for a high-conductivity electrode of a battery. On the other hand, amorphous silicon can occlude more carrier ions such as lithium ions than crystalline silicon; thus, the use of amorphous silicon leads to an increase in discharge capacity.

In this embodiment, the negative electrode mix layer 512 may be formed in such a manner that a conductive additive and a binder are added to the negative electrode active material, and the materials are ground, mixed, and baked.

As another example of the method for forming the negative electrode 510, as in the positive electrode 500, graphene may be introduced into the negative electrode mix layer 512 in the negative electrode 510. As a result of this, the bond between the negative electrode active materials can be maintained even when the negative electrode active materials are expanded or contracted due to charge/discharge. Further, the graphene also serves as a conductive additive.

In the case where graphite is used as the negative electrode active material, for example, NMP (N-methylpyrrolidone) in which a vinylidene fluoride-based polymer such as polyvinylidene fluoride is dissolved is mixed as a binder with graphite powder, whereby slurry is formed. Then, the slurry is applied to one of or both the surfaces of the negative electrode current collector 511, and dried. In the case where only one surface of the negative electrode current collector 511 is subjected to this coating step, the same step is repeated so that the negative electrode mix layer is formed on the other surface. After that, rolling with a roller press machine is performed, whereby the negative electrode 510 is formed.

In the case where silicon is used as the negative electrode active material, the negative electrode mix layer is easily flaked if thin-film silicon is simply formed on the negative electrode current collector 511 because the volume of silicon quadruples due to occlusion of carrier ions. Therefore, silicon needs to be processed into a shape other than a thin-film shape, such as a particle shape, a whisker-like shape, or a nanowire shape.

An example of using a negative electrode active material with a particle shape or a whisker-like shape will be described below with reference to FIGS. 6A to 6D.

FIG. 6A is a cross-sectional view of the negative electrode 510. In the negative electrode, the negative electrode mix layers 512 are formed on both surfaces of the negative electrode current collector 511. The negative electrode mix layers 512 include at least a negative electrode active material and may further include a binder, a conductive additive, and/or graphene.

Figure 6B:
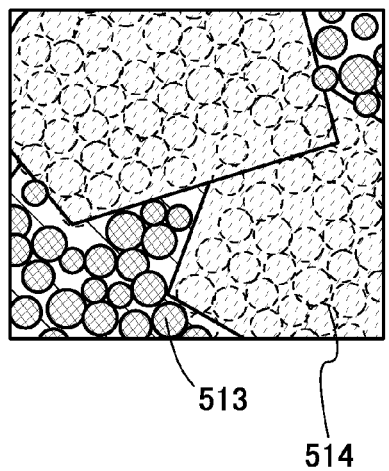

FIG. 6B is a plan view of a part of the negative electrode mix layer 512. The negative electrode mix layer 512 includes particulate negative electrode active materials 513 and the graphenes 514 which cover a plurality of the negative electrode active materials 513 and at least partly surround the plurality of the negative electrode active materials 513. The different graphenes 512 cover surfaces of the plurality of the negative electrode active materials 513 in the negative electrode mix layer 512 in the plan view. The negative electrode active materials 513 may partly be exposed.

Figure 6C:
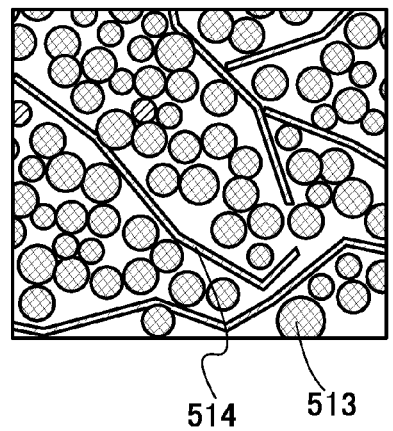

FIG. 6C is a cross-sectional view of a part of the negative electrode mix layer 512 in FIG. 6B. FIG. 6C illustrates the negative electrode active materials 513 and the graphenes 514 covering a plurality of the negative electrode active materials 513 in the negative electrode mix layer 512 in the plan view. The graphenes 514 are observed to have linear shapes in the cross-sectional view. One graphene or a plurality of the graphenes overlap with a plurality of the negative electrode active materials 513, or the plurality of the negative electrode active materials 513 are at least partly surrounded with one graphene or a plurality of the graphenes. Note that the graphene 514 has a bag-like shape, and a plurality of the negative electrode active materials are at least partly surrounded with the bag-like portion in some cases. The graphene 514 partly has openings where the negative electrode active materials 513 are exposed in some cases.

The desired thickness of the negative electrode mix layer 512 is determined in the range of 20 μm to 100 μm.

The negative electrode mix layer 512 may contain a known conductive additive such as acetylene black particles having a volume 0.1 to 10 times as large as that of the graphene, or carbon particles having a one-dimensional expansion (e.g., carbon nanofibers), and/or a known binder such as polyvinylidene difluoride.

The negative electrode mix layer 512 may be predoped with lithium in such a manner that a lithium layer is formed on a surface of the negative electrode mix layer 512 by a sputtering method. Alternatively, lithium foil is provided on the surface of the negative electrode mix layer 512, whereby the negative electrode mix layer 512 can be predoped with lithium. Particularly in the case where the graphenes 504 are formed in the positive electrode mix layer 502 of the positive electrode 500 after the lithium secondary battery is assembled, the negative electrode mix layer 512 is preferably predoped with lithium.

As an example of the negative electrode active material 513, a material whose volume is expanded by occlusion of carrier ions is given. When such a material is used, the negative electrode mix layer gets vulnerable and is partly collapsed by charge and discharge, resulting in lower reliability (e.g., inferior cycle characteristics) of the lithium secondary battery. However, the graphene 514 covering the periphery of the negative electrode active materials 513 in the negative electrode in the lithium secondary battery of one embodiment of the present invention can prevent the negative electrode active materials 513 from being pulverized and can prevent the negative electrode mix layer 512 from being collapsed, even when the volume of the negative electrode active materials 513 is increased/decreased due to charge/discharge. That is to say, the graphene 514 included in the negative electrode in the lithium secondary battery of one embodiment of the present invention has a function of maintaining the bond between the negative electrode active materials 513 even when the volume of the negative electrode active materials 513 is increased/decreased due to charge/discharge. Thus, the use of the negative electrode 510 allows an improvement in durability of the power storage element.

That is to say, a binder does not have to be used in forming the negative electrode mix layer 512. Therefore, the proportion of the negative electrode active materials in the negative electrode mix layer with certain weight can be increased, leading to an increase in charge and discharge capacity per unit weight (unit volume) of the electrode.

The graphene 514 has conductivity and is in contact with a plurality of the negative electrode active materials 513; thus, it also serves as a conductive additive. Thus, a conductive additive does not have to be used in forming the negative electrode mix layer 512. Accordingly, the proportion of the negative electrode active materials in the negative electrode mix layer with certain weight (certain volume) can be increased, leading to an increase in charge and discharge capacity per unit weight (unit volume) of the electrode.

A sufficient conductive path (conductive path of carrier ions) is formed efficiently in the negative electrode mix layer 512 containing the graphene 514, so that the negative electrode mix layer 512 and the negative electrode 510 have high conductivity. Accordingly, the capacity of the negative electrode active material 513 in the power storage element including the negative electrode 510, which is almost equivalent to the theoretical capacity, can be utilized efficiently; thus, the charge and discharge capacity can be sufficiently high.

Note that the graphene 514 also functions as a negative electrode active material capable of occluding and releasing carrier ions, leading to an increase in charge and discharge capacity of the negative electrode 510.

Next, a formation method of the negative electrode mix layer 512 in FIGS. 6B and 6C will be described.

Slurry containing the particulate negative electrode active materials 513 and graphene oxide is formed. Specifically, the particulate negative electrode active materials 513 and a dispersion liquid containing graphene oxide are mixed to form the slurry.

Then, the slurry is applied to the negative electrode current collector 511. Next, drying is performed in a vacuum for a certain period of time to remove a solvent from the slurry applied to the negative electrode current collector 511. After that, rolling with a roller press machine is performed.

Then, the graphene oxide is electrochemically reduced with electric energy or thermally reduced by heat treatment to form the graphene 514. Through the above process, the negative electrode mix layers 512 can be formed on both surfaces of the negative electrode current collector 511, whereby the negative electrode 510 can be formed.

Next, the structure of a negative electrode in FIG. 6D will be described.

Figure 6D:
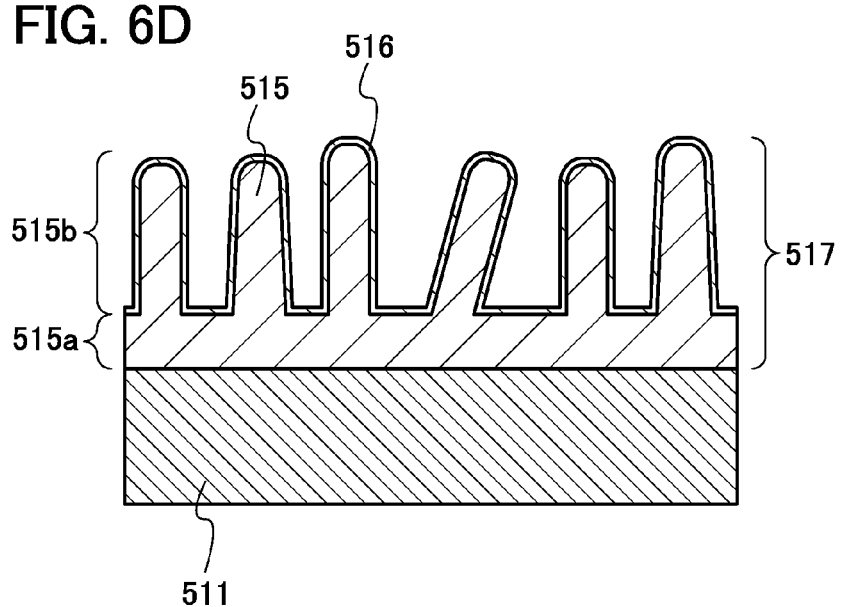

FIG. 6D is a cross-sectional view of the negative electrode where the negative electrode mix layer 517 is formed on the negative electrode current collector 511. The negative electrode mix layer 517 includes a negative electrode active material 515 having an uneven surface and graphene 516 covering a surface of the negative electrode active material 515.

The uneven negative electrode active material 515 includes a common portion 515a and a projected portion 515b extending from the common portion 515a. The projected portion 515b can have a columnar shape such as a cylinder shape or a prism shape, or a needle shape such as a cone shape or a pyramid shape as appropriate. The top portion of the projected portion may be curved. The negative electrode active material 515 is formed using a negative electrode active material capable of occluding and releasing carrier ions (typically, lithium ions). Note that the common portion 515a and the projected portion 515b may be formed using either the same material or different materials.

When silicon is used as the negative electrode active material 515 in the negative electrode illustrated in FIG. 6D, the graphene 516 covering the periphery of the negative electrode active material 515 can prevent the negative electrode active material 515 from being pulverized and can prevent the negative electrode mix layer 517 from being collapsed, even when the volume of the negative electrode active material 515 is increased/decreased due to charge/discharge.

When a surface of the negative electrode mix layer is in contact with an electrolytic solution contained in a power storage device, the electrolytic solution and the negative electrode active material react with each other, so that a film is formed on a surface of a negative electrode. The film is considered necessary to relieve the reaction between the negative electrode and the electrolytic solution for stabilization. However, when the thickness of the film is increased, carrier ions are less likely to be occluded in the negative electrode, leading to problems such as a reduction in conductivity of carrier ions between the electrode and the electrolytic solution and a waste of the electrolytic solution.

The graphene 516 coating the surface of the negative electrode active material 515 can prevent an increase in thickness of the film, so that a decrease in charge and discharge capacity can be prevented.

Another structure of the uneven negative electrode active material 515 can be formed in such a manner that a projection portion is formed on the negative electrode current collector 511 as a part of the negative electrode current collector 511, and the negative electrode active material with a thin film shape is provided to cover the projection portion. With the structure, the projection portion functions as a core of the negative electrode active material with a thin film shape, so that the strength of the negative electrode active material can be increased. Thus, the structure is useful particularly in the case where the negative electrode active material is silicon, which is significantly expanded and contracted due to occlusion and release of carrier ions.

Next, a formation method of the negative electrode mix layer 517 in FIG. 6D will be described.

The uneven negative electrode active materials 515 are provided on both surfaces of the negative electrode current collector 511 by a printing method, an ink-jet method, a CVD method, or the like. Alternatively, a negative electrode active material having a film shape is formed by a coating method, a sputtering method, an evaporation method, or the like, and then is selectively removed, so that the uneven negative electrode active materials 515 are provided on the negative electrode current collector 511.

Then, the uneven negative electrode active material 515 is coated with a dispersion liquid containing graphene oxide. As a method for applying the dispersion liquid containing graphene oxide, the method described above may be employed as appropriate.

After a solvent in the dispersion liquid containing graphene oxide is removed, the graphene oxide is electrochemically reduced with electric energy to form the graphene 516. Alternatively, the graphene oxide may be thermally reduced with thermal energy to form the graphene 516.

When the graphene is thus formed with the use of the dispersion liquid containing graphene oxide, the surface of the uneven negative electrode active material 515 can be coated with the graphene 516 with an even thickness.

Note that the uneven negative electrode active material 515 (hereinafter referred to as silicon whiskers) formed of silicon can be provided on the negative electrode current collector 511 by an LPCVD method using silane, silane chloride, silane fluoride, or the like as a source gas.

The silicon whiskers may be amorphous. When amorphous silicon whiskers are used for the negative electrode mix layer 517, the volume is less likely to be changed due to occlusion and release of carrier ions (e.g., stress caused by expansion in volume is relieved). For this reason, the silicon whiskers and the negative electrode mix layer 517 can be prevented from being pulverized and collapsed, respectively, due to repeated cycles of charge and discharge; accordingly, a power storage device can have further improved cycle characteristics.

Alternatively, the silicon whisker may be crystalline. In this case, the crystalline structure having excellent conductivity and carrier ion mobility is in contact with the current collector in a wide range of area. Therefore, it is possible to further improve the conductivity of the entire negative electrode, which enables charge and discharge to be performed at much higher speed; accordingly, a power storage device whose charge and discharge capacity is improved can be fabricated.

Still alternatively, the silicon whisker may include a core, which is a crystalline region, and an outer shell covering the core, which is an amorphous region.

The amorphous outer shell has a characteristic that the volume is less likely to be changed due to occlusion and release of carrier ions (e.g., stress caused by expansion in volume is relieved). In addition, the crystalline core, which has excellent conductivity and ion mobility, has a characteristic that the rate of occluding ions and the rate of releasing ions are high per unit mass. Thus, when the silicon whisker having the core and the outer shell is used for the negative electrode active mix layer 517, charging and discharging can be performed at high speed; accordingly, a power storage device whose charge and discharge capacity and cycle characteristics are improved can be fabricated.

(Power Storage Element and Formation Method Thereof)

The belt-like positive electrode 500 and the belt-like negative electrode 510 formed in the above manner are cut into a plurality of positive electrodes each with a given size and a plurality of negative electrodes each with a given size, and the positive electrodes 500 and the negative electrodes 510 are connected to a positive electrode tab and a negative electrode tab, respectively. The connection between the electrode and the tab is specifically the connection between the current collector included in the electrode and the tab. The connection allows physical fixation as well as electrical connection. The positive electrodes and the negative electrodes can be fixed to the positive electrode tab and the negative electrode tab, respectively, by an ultrasonic welding method, for example.

Then, one continuous separator is provided between the plurality of positive electrodes 500 bound with the tab and the plurality of negative electrodes 510 bound with the tab or each of a plurality of sheet-like separators is provided between the positive electrode 500 and the negative electrode 510. For the separator, an insulating porous material is used; an insulating material which has a low coefficient of sliding friction against surfaces of the positive electrode and the negative electrode and is nonadhesive, such as polypropylene or polytetrafluoroethylene, is preferably used.

This embodiment can be implemented in combination with any of the other embodiments as appropriate.

Embodiment 5

The power storage device of one embodiment of the present invention can be used for power supplies of a variety of electrical devices. Here, "electrical devices" refer to all general industrial products including portions which operate by electric power. Electrical devices are not limited to consumer products such as home electrical products and also include products for various uses such as business use, industrial use, and military use in their category.

Specific examples of electrical appliances each utilizing the power storage device of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, portable wireless devices, mobile phones, car phones, portable game machines, toys, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using electric power from the lithium secondary batteries are also included in the category of electrical appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electrical devices, the power storage device of one embodiment of the present invention can be used as a main power supply for supplying enough electric power for almost the whole power consumption. Alternatively, in the electrical devices, the power storage device of one embodiment of the present invention can be used as an uninterruptible power supply which can supply electric power to the electrical devices when the supply of electric power from the main power supply or a commercial power supply is stopped. Still alternatively, in the electrical devices, the power storage device of one embodiment of the present invention can be used as an auxiliary power supply for supplying electric power to the electrical devices at the same time as the power supply from the main power supply or a commercial power supply.

Figure 7:
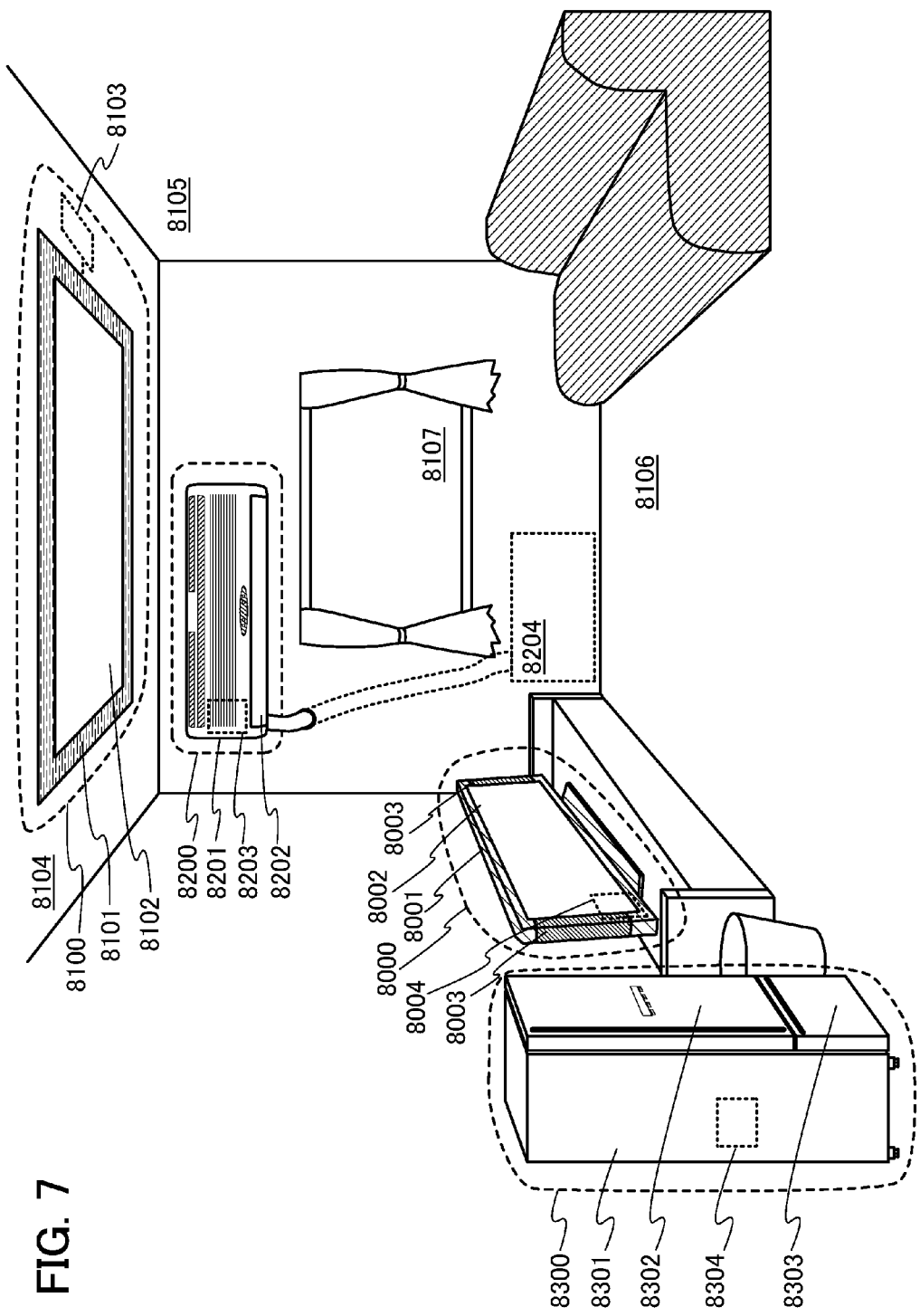
FIG. 7 illustrates electrical devices.

FIG. 7 illustrates specific structures of the electrical devices. In FIG. 7, a display device 8000 is an example of an electrical device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception. The power storage device of one embodiment of the present invention can be used for display devices particularly for displaying information which are thin and have curved surfaces, owing to their thinness and flexibility.

In FIG. 7, an installation lighting device 8100 is an example of an electrical device including a power storage device 8103 of one embodiment of the present invention. Specifically, the lighting device 8100 includes a housing 8101, a light source 8102, and a power storage device 8103. Although FIG. 7 illustrates the case where the power storage device 8103 is provided in a ceiling 8104 on which the housing 8101 and the light source 8102 are installed, the power storage device 8103 may be provided in the housing 8101. Particularly in the case where the lighting device 8100 is thin and has a curved surface, the power storage device of one embodiment of the present invention is suitable for the lighting device 8100. The lighting device 8100 can receive electric power from a commercial power supply. Alternatively, the lighting device 8100 can use electric power stored in the power storage device 8103. Thus, the lighting device 8100 can be operated with the use of the power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 7 as an example, the power storage device of one embodiment of the present invention can be used in an installation lighting device provided in, for example, a wall 8105, a floor 8106, a window 8107, or the like other than the ceiling 8104. Alternatively, the power storage device can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 7, an air conditioner including an indoor unit 8200 and an outdoor unit 8204 is an example of an electrical device including a power storage device 8203 of one embodiment of the invention. Specifically, the indoor unit 8200 includes a housing 8201, an air outlet 8202, and a power storage device 8203. Although FIG. 7 illustrates the case where the power storage device 8203 is provided in the indoor unit 8200, the power storage device 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the secondary batteries 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 7 as an example, the power storage device of one embodiment of the present invention can be used in an air conditioner in which the functions of an indoor unit and an outdoor unit are integrated in one housing.

In FIG. 7, an electric refrigerator-freezer 8300 is an example of an electrical device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 7. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electrical devices described above, a high-frequency heating apparatus such as a microwave oven and an electrical device such as an electric rice cooker require high power in a short time. The tripping of a breaker of a commercial power supply in use of an electrical device can be prevented by using the power storage device of one embodiment of the present invention as an auxiliary power supply for supplying electric power which cannot be supplied enough by a commercial power supply.

In addition, in a time period when electrical devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electrical devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 6

In this embodiment, an example of an electrical device having a curved surface in which the power storage device of one embodiment of the present invention is used will be described with reference to FIGS. 8A and 8B.

Figure 8A:
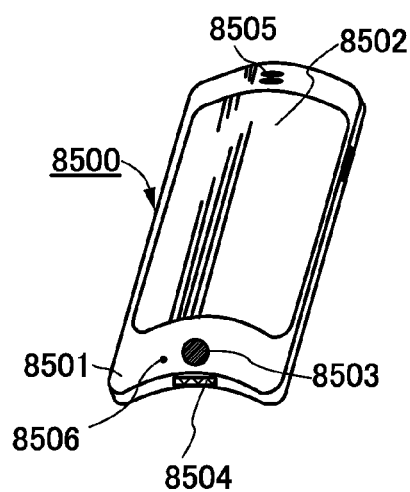
FIGS. 8A and 8B illustrate electrical devices.

FIG. 8A illustrates an example of a mobile phone. A mobile phone 8500 includes a display portion 8502 incorporated in a housing 8501, an operation button 8503, an external connection port 8504, a speaker 8505, a microphone 8506, and the like. The mobile phone 8500 also includes the power storage device of one embodiment of the present invention.

When the display portion 8502 of the mobile phone 8500 illustrated in FIG. 8A is touched with a finger or the like, data can be input into the mobile phone 8500. Further, operations such as making a call and inputting text can be performed by touching the display portion 8502 with a finger or the like.

With the operation button 8503, the power can be turned on or off. In addition, types of images displayed on the display portion 8502 can be switched; switching images from a mail creation screen to a main menu screen.

The mobile phone 8500 in this embodiment includes the flexible power storage device of one embodiment of the present invention. In FIG. 8A, the mobile phone 8500 is curved upward in the lateral direction thereof. Thus, the power storage device of one embodiment of the present invention is provided so that the mobile phone 8500 has flexibility in the lateral direction thereof. In this manner, the mobile phone can be thin and have a curved shape.

Figure 8B:
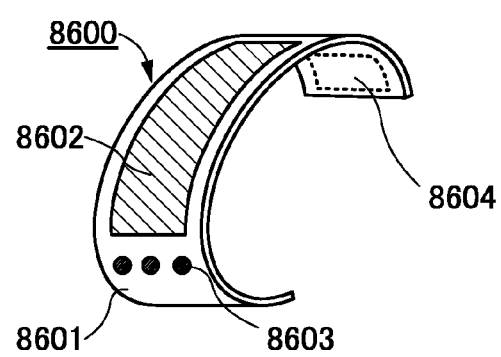

FIG. 8B is an example of a wristband-type display device. A portable display device 8600 includes a housing 8601, a display portion 8602, an operation button 8603, and a sending and receiving device 8604. The portable display device 8600 also includes the power storage device of one embodiment of the present invention.

The portable display device 8600 can receive a video signal with the sending and receiving device 8604 and can display the received video on the display portion 8602. In addition, with the sending and receiving device 8604, the portable display device 8600 can send an audio signal to another receiving device.

With the operation button 8603, turning on and off the power, switching displayed videos, adjusting volume, and the like can be performed.

The portable display device 8600 in this embodiment includes the power storage device having flexibility of one embodiment of the present invention. In FIG. 8B, the portable display device 8600 is curved upward in the longitudinal direction thereof. Thus, the power storage device of one embodiment of the present invention is provided so that the portable display device 8600 has flexibility in the longitudinal direction thereof. In this manner, the portable display device which is thin and has a curved surface can be formed.

Note that it is needless to say that one embodiment of the present invention is not limited to the electrical appliance described above as long as the power storage device of one embodiment of the present invention is included.

This embodiment can be implemented in combination with any of the other embodiments as appropriate.

This application is based on Japanese Patent Application serial no. 2012-042918 filed with the Japan Patent Office on Feb. 29, 2012, the entire contents of which are hereby incorporated by reference.

What is claimed is:

1. A power storage device comprising:
    a supporting board of an insulator; and
    power storage elements over the supporting board, each including:
        a positive electrode;
        a first separator over the positive electrode;
        a negative electrode over the first separator; and
        a second separator over the negative electrode,
    wherein a plurality of the power storage elements are stacked,
    wherein the positive electrode, the negative electrode, the first separator, and the second separator have sheet-like shapes and flexibility,
    wherein one end portion of each of the positive electrodes is fixed to a positive electrode tab,
    wherein one end portion of each of the negative electrodes is fixed to a negative electrode tab,
    wherein the plurality of the power storage elements are placed between the positive electrode tab and the negative electrode tab,
    wherein the supporting board comprises a first region connected to the positive electrode tab and a second region connected to the negative electrode tab, and
    wherein the supporting board comprises a curved region between the first region and the second region.

2. The power storage device according to claim 1,
wherein each of the positive electrodes includes a positive electrode current collector and positive electrode mix layers between which the positive electrode current collector is provided, and
wherein each of the positive electrode mix layers includes positive electrode active material and graphene which cover the positive electrode active material.

3. The power storage device according to claim 1,
wherein each of the negative electrodes includes a negative electrode current collector and negative electrode mix layers between which the negative electrode current collector is provided, and
wherein each of the negative electrode mix layers includes negative electrode active material and graphene which cover the negative electrode active material.

4. The power storage device according to claim 3,
wherein a surface of each of the negative electrode mix layers has a plurality of projections.

5. The power storage device according to claim 1,
wherein the first separator and the second separator comprise polypropylene or polytetrafluoroethylene.

6. The power storage device according to claim 1,
wherein the supporting board is configured to keep a distance between the positive electrode tab and the negative electrode tab.

7. The power storage device according to claim 1,
wherein the supporting board and the power storage elements are sealed with a flexible exterior body.

8. A power storage device comprising:
a supporting board of an insulator; and
power storage elements over the supporting board, each including:
   a positive electrode;
   a first separator over the positive electrode;
   a negative electrode over the first separator; and
   a second separator over the negative electrode,
wherein a plurality of the power storage elements are stacked,
wherein the positive electrode and the negative electrode have sheet-like shapes and flexibility,
wherein the first separator and the second separator have a continuous sheet-like shape and flexibility,
wherein the first separator and the second separator are one separator folded so as to separate the positive electrode and the negative electrode,
wherein one end portion of each of the positive electrodes is fixed to a positive electrode tab,
wherein one end portion of each of the negative electrodes is fixed to a negative electrode tab,
wherein the plurality of the power storage elements are placed between the positive electrode tab and the negative electrode tab,
wherein the supporting board comprises a first region connected to the positive electrode tab and a second region connected to the negative electrode tab, and
wherein the supporting board comprises a curved region between the first region and the second region.

9. The power storage device according to claim 8,
wherein each of the positive electrodes includes a positive electrode current collector and positive electrode mix layers between which the positive electrode current collector is provided, and
wherein each of the positive electrode mix layers includes positive electrode active material and graphene which cover the positive electrode active material.

10. The power storage device according to claim 8,
wherein each of the negative electrodes includes a negative electrode current collector and negative electrode mix layers between which the negative electrode current collector is provided, and
wherein each of the negative electrode mix layers includes negative electrode active material and graphene which cover the negative electrode active material.

11. The power storage device according to claim 10,
wherein a surface of each of the negative electrode mix layers has a plurality of projections.

12. The power storage device according to claim 8,
wherein the first separator and the second separator comprises polypropylene or polytetrafluoroethylene.

13. The power storage device according to claim 8,
wherein the first separator and the second separator wrap the other end portion of each of the positive electrodes and the other end portion of each of the negative electrodes alternately.

14. The power storage device according to claim 8,
wherein the supporting board is configured to keep a distance between the positive electrode tab and the negative electrode tab.

15. The power storage device according to claim 8,
wherein the supporting board and the power storage elements are sealed with a flexible exterior body.

16. A power storage device comprising:
a supporting board of an insulator; and
a power storage element over the supporting board, including:
   a first positive electrode;
   a first separator over the first positive electrode;
   a first negative electrode over the first separator;
   a second separator over the first negative electrode;
   a second positive electrode over the second separator;
   a third separator over the second positive electrode; and
   a second negative electrode over the third separator,
wherein one end portion of the first positive electrode and one end portion of the second positive electrode are fixed to a positive electrode tab,
wherein one end portion of the first negative electrode and one end portion of the second negative electrode are fixed to a negative electrode tab, and
wherein the plurality of the power storage elements are placed between the positive electrode tab and the negative electrode tab,
wherein the supporting board comprises a first region connected to the positive electrode tab and a second region connected to the negative electrode tab so as to keep a distance between the positive electrode tab and the negative electrode tab, and
wherein the supporting board comprises a curved region between the first region and the second region.

17. The power storage device according to claim 16,
wherein the first positive electrode and the second positive electrode each include a positive electrode current collector and positive electrode mix layers between which the positive electrode current collector is provided, and
wherein each of the positive electrode mix layers includes positive electrode active material and graphene which cover the positive electrode active material.

18. The power storage device according to claim 16,
wherein the first negative electrode and the second negative electrode each include a negative electrode current collector and negative electrode mix layers between which the negative electrode current collector is provided, and wherein each of the negative electrode mix layers includes negative electrode active material and graphene which cover the negative electrode active material.

19. The power storage device according to claim 16, wherein the first separator, the second separator, and the third separator comprise polypropylene or polytetrafluoroethylene.

20. The power storage device according to claim 16, wherein the supporting board and the power storage element is sealed with a flexible exterior body.

* * * * *